US008007610B2

(12) United States Patent
Schneider

(10) Patent No.: US 8,007,610 B2
(45) **Date of Patent: *Aug. 30, 2011**

(54) PROCESS AND DEVICE FOR GLUING DRIED FIBRES DESIGNATED FOR THE PRODUCTION OF FIBREBOARDS

(75) Inventor: Fritz Schneider, Krefeld (DE)

(73) Assignee: Dieffenbacher GmbH Maschinen- und Anlagenbau, Eppingen (DE)

( * ) Notice: Subject to any disclaimer, the term of this patent is extended or adjusted under 35 U.S.C. 154(b) by 1324 days.

This patent is subject to a terminal disclaimer.

(21) Appl. No.: 11/423,894

(22) Filed: Jun. 13, 2006

(65) Prior Publication Data

US 2007/0001350 A1 Jan. 4, 2007

Related U.S. Application Data

(60) Division of application No. 10/364,784, filed on Feb. 11, 2003, now Pat. No. 7,094,309, which is a continuation of application No. PCT/EP01/09212, filed on Aug. 9, 2001.

(30) Foreign Application Priority Data

Aug. 11, 2000 (DE) .................................. 100 39 226
Dec. 8, 2000 (DE) .................................. 100 61 072

(51) Int. Cl.
*B32B 23/02* (2006.01)

(52) U.S. Cl. ....................... 156/62.2; 156/62.4; 264/121

(58) Field of Classification Search ................. 156/62.2, 156/62.4; 264/115, 121; 427/212; 241/28, 241/189.1, 191; 118/303, 209, 244; 406/71
See application file for complete search history.

(56) References Cited

U.S. PATENT DOCUMENTS 7,094,309 B2 * 8/2006 Schneider .................... 156/296

FOREIGN PATENT DOCUMENTS

DE 1078759 * 3/1960

* cited by examiner

*Primary Examiner* — Michael A Tolin
(74) *Attorney, Agent, or Firm* — Fox Rothschild LLP

(57) ABSTRACT

Dried fibers which are designated for the production of fiber boards are supplied to a fiber roller (17) from a metering device through a feed chute (10) which is subjected to negative pressure, which fiber roller is provided on its surface with a plurality of pins (18) and rotates in such a manner that the fibers (14) are deflected by the pins (18), are directed along a chute section (22) defined by means of a partial section (20) of the periphery of the fiber roller (17) and an opposite-lying wall (21) and gluing means and said fibers are accelerated to approximately the peripheral speed of the fiber roller (17) by means of the pins (18) and an air flow generated by said pins. The fibers (36) lie against a section of the wall and are glued in the region of or adjacent to one end of the wall section and exit at an outlet orifice (23) of the chute section (22). In the case of an alternative process, after exiting the chute section substantially horizontally the fibers are deflected in an upward or downward direction and are glued in this region by means of at least one spray nozzle.

14 Claims, 25 Drawing Sheets

Figure 1A:
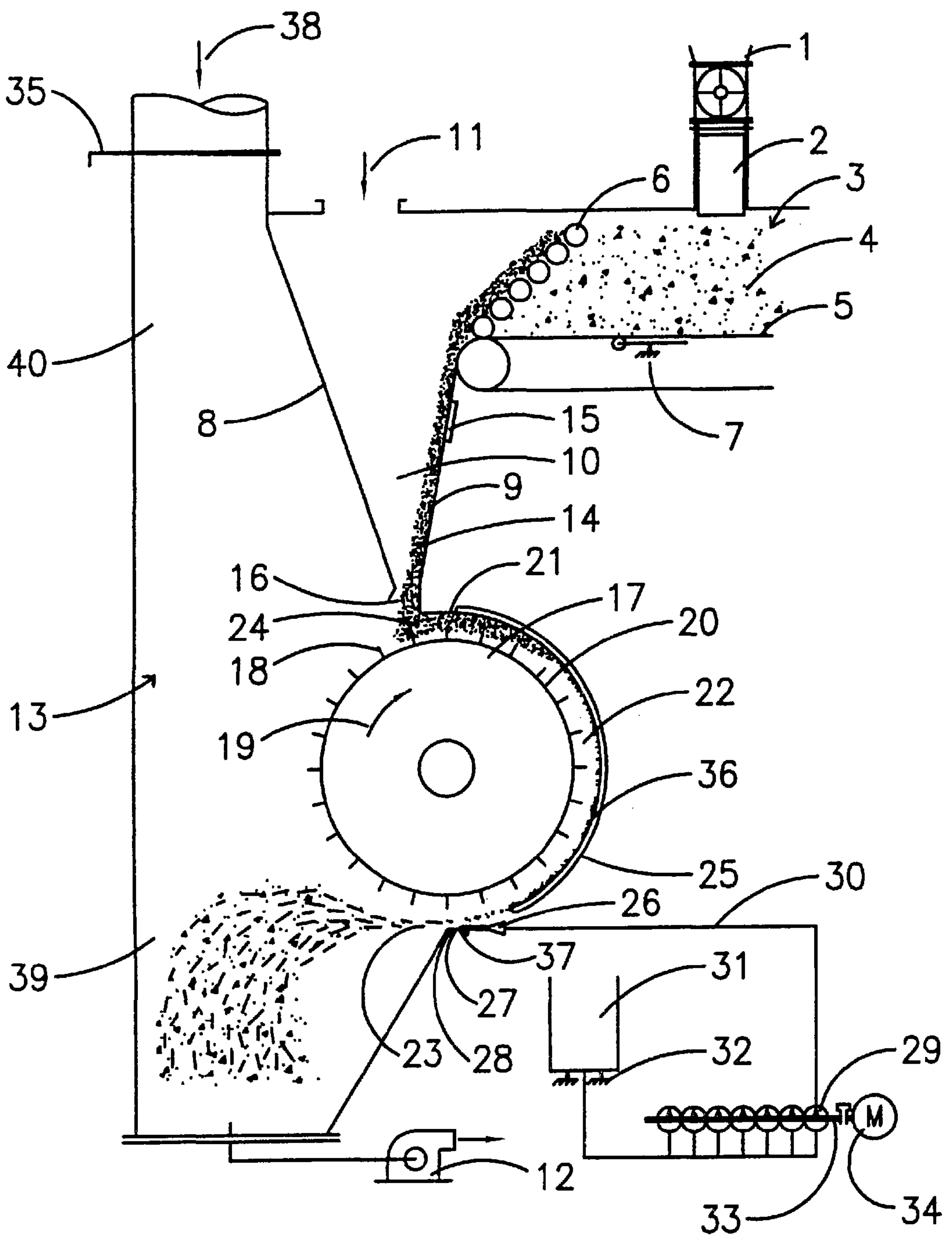

PROCESS AND DEVICE FOR GLUING DRIED FIBRES DESIGNATED FOR THE PRODUCTION OF FIBREBOARDS

This application is a Division of U.S. application Ser. No. 10/364,784, filed Feb. 11, 2003, now U.S. Pat. No. 7,094,309, which is a continuation of International Application No. PCT/EP01/09212, filed Aug. 9, 2001.

The invention relates to processes and devices for gluing dried fibres designated for the production of fibreboards. The fibres preferably consist of lignocellulose-containing and/or cellulose-containing materials. The fibreboards are light, medium-density or high-density fibreboards.

It is conventional to glue fibres, which are designated for the production of MDF- or HDF-boards, in the wet state. By means of this so-called blow-line gluing system, the binding agent is sprayed into a blowpipe, which terminates in the inlet region of the pipe drier, behind a refiner and on to the wet, still hot fibres. The fibres are then dried. The blow-line gluing system renders it possible to glue fibres in a uniform manner and thus to obviate the formation of lumps made up of glue and fibres. However, one considerable disadvantage of the blow-line gluing system is the relatively high glue consumption (cf. e.g.: Buchholzer, P., "Leimverlusten auf der Spur" [on the track of glue losses], pages 22-24, MDF-Magazin 1999). The increased glue consumption is caused by virtue of the fact that a part of the reactivity of the glue during the process of drying the fibres is lost by reason of the high temperatures. Therefore, in the dryer system the emission of formaldehyde, which originates from the glue, is considerable, whereby it is necessary to implement a costly process of minimizing pollutants. A further disadvantage of the blow-line gluing system is that the fibres which are glued in this manner have a low level of cold-stickiness due to the pre-curing in the dryer, so that after preliminary pressing a fibre mat which is formed from the fibres has a high spring-back tendency. During compaction of the fibre mat, this can cause the fibre mat structure to be destroyed by reason of a substantial displacement of air from the fibre mat.

The disadvantages of the blow-line gluing system can also be avoided by gluing the fibres in the dry state. It is thus known to glue dried fibres in a mixer. However, the process of dry-gluing fibres in mixers has the disadvantage that fibre agglomerates and matted fibres are produced which lead to non-uniform gluing of the fibres and to an undesired formation of glue spots on the surfaces of the boards (cf. loc. cit.). A dry gluing machine, in which mixing tools can be provided, is described in EP 0 744 259 B1.

EP 0 728 562 A2 discloses a process of dry-gluing fibres, wherein the fibre flow is separated in a pneumatic delivery line by the generation of substantial turbulence by reason of the reduced flow rate and the fibres in this separation zone are wetted by spraying.

DE 199 30 800 A1 describes a process of dry-gluing fibres, wherein the gluing process is performed in an end section of a pipe dryer. In our view, there is still no evidence of experience of this process in an industrial trial. The disadvantage of this process appears to be that an extremely large proportion of hot gas and water vapor together with the fibres must pass through the gluing zone, as it is absolutely necessary for the glue to be atomized to the smallest particles upon being sprayed into the gluing zone. In the case of this proportion of hot gas and water vapor which in the process is separated from the fibres immediately after the gluing process by means of a cyclone, it is to be assumed that a portion of the glue escapes into the atmosphere together with the hot gas and the water vapor from the fibre mixture. Furthermore, in the case of this known process, problems can arise in relation to the uniformity of the gluing in view of the random air turbulence generated. Furthermore, in the case of this process it appears to be difficult to keep the drying moisture of the fibres under control within the tolerances of +/−0.5% of the desired value, which tolerances are very important for the further process.

It should also be mentioned that gluing devices of the so-called "roller blender" type have been known for some time, wherein glue is applied to wood particles by means of rollers (Maloney, Thomas M., "Modern Particleboard & Dry-process Fibreboard Manufacturing", page 439 f., Miller Freeman Publ. 1977, San Francisco, Calif., USA).

It is the object of the invention to wet as many fibre surfaces as possible with binding agent with a high degree of uniformity.

With respect to the process, this object is achieved by a process of gluing dried fibres which are designated for the production of fibreboards. The fibres are supplied from a metering device through a feed chute, which is subjected to negative pressure, to a fibre roller which is provided on its surface with a plurality of pins which preferably taper in a conical manner in a radial direction. The fibre roller rotates in such a manner that the fibres are deflected by the pins and directed along a chute section which is defined by a partial section of the periphery of the fibre roller and by an opposite-lying wall and the gluing means lying opposite the fibre roller. The fibres are accelerated by the pins and by an air flow, generated by said pins, to approximately the peripheral speed of the fibre roller. The centrifugal force causes the fibres to be removed from the fibre roller and to lie against a section of the wall, wherein they no longer come into contact with the pins. In the region of the wall section or adjacent to one end of the wall section, the fibres are glued before exiting at an outlet orifice of the chute section.

The fibres leave the feed chute in a fibre flow and impinge upon the fibre roller. The effect of the pins which are disposed on the rapidly rotating fibre roller not only causes the fibres to be deflected but also to be accelerated greatly, whereby any irregularities such as fibre agglomerates are eliminated. Furthermore, by virtue of the acceleration of the fibres in the flow direction the fibre flow is extended by a multiple in comparison with the fibres in the feed chute. At the same time, the pressure, at which the fibres are pressed against the wall during transportation through the chute section, serves to increase the bulk weight of the fibres, e.g. to triple the bulk weight of the fibres inside the feed chute. Accordingly, at increased bulk weight the height of the fibre flow is reduced. The extension of the fibre flow and the reduction in the height thereof render it possible to glue the fibres effectively. Furthermore, the fibres are guaranteed to be glued in a uniform manner by virtue of the fact that the fibre roller processes the fibre flow with respect to any existing irregularities. Since the glued fibres are not subjected to any mixing, it is possible substantially to prevent any internal contamination of a gluing device used.

In order to glue the fibres in a uniform manner, it is preferably provided that the fibres are supplied from a metering bin, which can comprise an integrated mass determination device, in a mass flow, which is uniform across the width, to the fibre roller and are transported through the chute section, i.e. that the length of the fibre roller and the width of the adjoining chute section, in which the gluing means are disposed, correspond to the width of the fibre flow.

The rotational speed of the fibre roller and thus the acceleration of the fibres by means of this roller are preferably selected such that after the fibres have impinged upon the fibre roller, the fibres lie approximately after one quarter of the fibre roller periphery against the wall of the chute section. In accordance with the invention, the fibres are glued in the region of this wall section or on one end of the wall section. The gluing performed on one end of the wall section and thus immediately before the fibres exit the chute section is proven to be advantageous such that it is scarcely possible for the chute section to become contaminated by the glued fibres.

The gluing process can be performed by means of glue slot nozzles. The glue is pumped from these glue slot nozzles into the chute section, so that the glue flows out of the slot nozzles and is entrained by friction by the fibres which are transported through the chute section. By virtue of the fact that the fibre flow is separated to such a great extent and an extremely large fibre surface is provided, it is possible to achieve a high degree of uniformity in the gluing of fibres by metering the glue accordingly. In the case of an arrangement of glue slot nozzles inside the wall section, the wall section is provided with gluing slots, in which the outlet orifices of the glue slot nozzles are disposed. The glue slot nozzles can be disposed in two planes offset with respect to each other over the entire width of the chute section, in order in this manner to guarantee adequate stability in the wall of the chute section which is interrupted by the glue slots. Preferably, the fibres impinge in the region of the glue slots nozzles upon a gluing board which in the arrangement of the glue slot nozzles on the end of the wall section is able to extend in one piece over the entire width of the chute section. The gluing board serves to deflect the fibre flow, whereby the fibres exert a pressure upon the gluing board. The fibres receive glue on the gluing board by virtue of the fact that glue flows through the glue slot nozzles onto the gluing board and the fibre pressure causes mechanical abrasion by the fibres on the surface of the gluing board.

It is also possible to provide spray nozzles either instead of the glue slot nozzles or in addition thereto. If both the glue slot nozzles and also the spray nozzles are provided, the fibre flow is initially wetted by way of the spray nozzles with a part of the glue quantity provided and subsequently the remaining quantity of glue can be applied to the fibres by means of the glue slot nozzles.

If spray nozzles are used instead of glue slot nozzles, it is extremely advantageous if the fibres impinge upon a gluing board after the spraying of glue for static mixing purposes.

Preferably, the gluing board comprises a surface which is provided with a profile. For example, this profile can be a fin-like profile, nail-like profile or a step-like profile. The respective profile causes the fibres impinging upon the gluing board to be subjected to increased friction on the gluing board and the fibres are deflected in numerous ways. The deflection results in a swirling of the fibres and thus in static thorough-mixing of the glue and the fibres. By reason of the increased level of friction and the static thorough-mixing, the gluing effect is enhanced considerably. However, it is also possible for the surface of the gluing board to be smooth.

Preferably, the gluing board can be angularly adjusted with respect to the flow direction of the fibres, in order thus to deflect the fibres in a desired manner and to be able to adjust the desired pressure of the fibres on the gluing board.

Preferably, the gluing board is angularly adjusted with respect to the flow direction of the fibres such that during or immediately after receiving the glue the fibres are deflected in such a manner that the fibres are then returned to the effective region of the fibre roller. Whilst receiving the glue and during the deflection of the fibre flow, the fibres are decelerated significantly and caught and overtaken by the pins of the rotating fibre roller. In this manner, the fibres are subjected to further mixing. More intensive fibre gluing can thus be achieved. Contrary to expectation, no glue deposits are formed on the pins of the fibre roller.

Alternatively, it can be provided that in the region of the glue slot nozzles the fibres impinge tangentially upon a gluing roller which rotates in the direction of movement of the fibres and which is disposed slightly below the plane of the glue slot nozzles. The gluing roller serves as a rotating gluing board and therefore, like the fixed gluing board, preferably comprises a surface which is provided with a profile, for example a fin-like profile, a nail-like profile or a step-like profile. In the case of this profiled gluing roller, increased friction of the fibres is also produced on the gluing roller and the fibres are also deflected in a numerous ways, whereby in turn the glue and the fibres undergo extremely effective thorough-mixing. Alternatively, the surface of the gluing roller can also be smooth and planar. Preferably, the surface of the gluing roller is chromium-plated.

Accordingly, it is also possible to provide a rotating gluing roller, if spray nozzles are provided instead of the glue slot nozzles or in addition thereto.

Preferably, as the fibres impinge upon the gluing roller they are deflected towards the fibre roller in such a manner that the fibres are then caught by the pins of the fibre roller.

In this case, the same advantages are achieved as in the case of the above-described, corresponding deflection of the fibres by the gluing board.

The gluing roller represents a part of the boundary of the chute section. If the gluing roller is disposed on the end of the chute section, it prevents any internal contamination of the wall of the chute section, in that any contamination by residues of glue in the immediate region where glue is transferred to the fibre flow is removed from the gluing region by the rotational movement of the gluing roller. As a consequence, by avoiding internal contamination of the chute section it is also possible to minimize the formation of fibre agglomerates.

The gluing roller can be cleaned continuously by means of a rotating brush which is in contact with a cleaning water reservoir. The cleaning water can be supplied to a glue processing installation and be used therein as glue formulation water.

In order to accelerate the pressing process when compacting the glued fibres to form fibreboards, accelerators are usually added to the glue. An accelerator of this type, the proportion of which generally amounts to 2 to 5% based upon the proportion of solid resin, can be applied to the surface of the gluing roller e.g. by spray nozzles. The rotational speed of the roller must be tailored in this case to suit the accelerator quantity to be metered. In comparison to applying the accelerator to the fibres in a mixture with the glue via the glue slot nozzles, it is possible by separately metering the accelerator in this way to reduce the degree of contamination of the device used for gluing purposes.

As an alternative to gluing by means of the glue slot nozzles or the spray nozzles, the fibres can also be glued by means of a glue roller which with a partial region of the outer surface defines the chute section in such a manner that glue is applied to the fibres by reason of the friction between the fibres and the outer surface. The glue roller is preferably disposed adjacent to the end of the wall section, against which the fibres lie, and said glue roller defines the chute section at its outlet orifice such that the fibres sliding along the wall section impinge approximately tangentially upon a part of the outer surface of the glue roller.

Preferably, the fibres impinge upon the glue roller in such a manner that the fibres are deflected in such a manner that they are then caught by the pins of the fibre roller. The advantages are the same as in the case of the above-described, corresponding deflection by means of the gluing board. It is also possible to deflect the fibres as described by means of the gluing board, the gluing roller or the glue roller, if these gluing means are not disposed adjacent to one end of the wall section but rather in the region of the wall section.

The outer surface of the glue roller can be formed with different profiles for receiving the glue. Therefore, it is possible to provide e.g. radial grooves, axial grooves or recesses in the form of spherical impressions. However, the outer surface of the glue roller can also be smooth and planar. It consists preferably of a hard, friction-resistant material, such as e.g. hard chromium-plating.

The glue roller can operate in combination with a glue-application roller in accordance with the principle of glue-application rollers for liquid substances as used in coating/painting lines for coating boards. The glue-application roller is disposed adjacent to the glue roller and defines therewith a glue reservoir. Between the two rollers there is a gap, through which a film of glue is applied to the glue roller when the two rollers rotate in opposite directions. Since the thickness of the film of glue on the glue roller is determined by the size of the gap between the glue roller and the glue-application roller, the gap can be adjusted by displacing the axis of the glue-application roller. The delivery rate of the glue roller or the quantity of glue transferred to the fibres is also determined by the rotational speed of the glue roller. In calculating the glue volume per revolution of the roller, it is necessary to take into consideration the spatial volume of the profiles in the case of glue rollers having a profiled outer surface. The addition of glue to the fibres can be controlled in this manner in dependence upon the fibre throughput of a belt weighing device in the metering device.

It can also be provided that a film of glue is applied to the glue roller by immersing the roller into a glue container.

If the glue roller is disposed in a region of the wall section, against which the fibres lie by reason of the centrifugal force, a glue reservoir can be provided which is defined by the outer surface of the wall of the chute section and by a part of the outer surface of the glue roller. By rotating the glue roller in the opposite direction to the direction of rotation of the fibre roller, glue from the glue reservoir is transferred to the fibres by the glue roller which protrudes through an orifice in the wall slightly into the chute section. If the glue roller is profiled, it is possible to provide a stripper which instead of the wall of the chute section defines the glue reservoir and ensures that at the inlet of the outer surface into the chute section, glue is present merely in recesses of the outer surface.

In all of the described cases of usage of a glue roller, the glue is applied to the fibres by mechanical abrasion. The friction is generated by the difference in the speed of the fibre flow and the speed of the glue roller.

As an alternative to directly adding an accelerator, in the case of the described processes employing a glue roller it is also possible for the accelerator to be applied to the fibres separately via nozzles or via an accelerator-application roller.

In the case of the described processes, the fibre throughput, the speed and the height of the fibre flow in the chute section are selected in such a manner that glue is received in an optimum manner at the point where fibres and glue come into contact.

With respect to the process, the aforementioned object is also achieved by virtue of the features of another embodiment of the invention. In a similar manner as the previously discussed embodiment, the fibres are supplied from a metering device through a feed chute, which is subjected to a negative pressure, to a fibre roller which is provided on its surface with a plurality of pins. The fibre roller rotates in such a manner that the fibres are deflected by the pins and directed along a chute section which is defined by a partial section of the periphery of the fibre roller, an opposite-lying wall and the gluing means lying opposite the fibre roller. The fibres are accelerated by the pins and by an air flow generated by the pins to approximately the peripheral speed of the fibre roller. The centrifugal force causes the fibres to be removed from the fibre roller and to lie against a section of the wall, wherein they no longer come into contact with the pins. In the case of this process, it is provided that in the course of the chute section the fibres are brought into contact at least once with the pins of the fibre roller by virtue of a metal baffle plate. For this purpose, the metal baffle plate is inclined in the manner of a ramp in the direction of the pins. The fibre flow which is deflected by means of the metal baffle plate and consequently decelerated considerably is caught by the pins of the rotating fibre roller and is then accelerated up to the original speed. By reason of the renewed acceleration by virtue of the pins, the fibres regain their original speed and are subjected to a further process for the purpose of disintegrating any irregularities. The centrifugal force causes the fibres to be centrifuged against a further wall section and to be directed in turn thereby. A further metal baffle plate can also follow which serves to return the fibres once again to the effective region of the fibre roller. The gluing means can be disposed in particular adjacent to one end of the last wall section in the flow direction of the fibres, against which the fibres lie. However, they can also be disposed inside one of the wall sections or between two wall sections.

Preferably, the metal baffle plates can be angularly adjusted with respect to flow direction of the fibres. As a consequence, the degree of deceleration of the fibres can be varied. The metal baffle plates are also preferably disposed in one piece over the entire operating width of the chute section.

In the course of the chute section, it is possible to dispose in a consecutive manner as many metal baffle plates as the length of the chute section and the rotational speed of the fibre roller allow. In this manner, by fully exploiting the length of the chute section, the fibres are subjected on a number of occasions to a disintegration process by the effect of the pins of the fibre roller. This process can be configured in the same manner as the above-described process which does not include the metal baffle plates.

With respect to the process, the aforementioned object is also achieved by virtue of the features of additional embodiments. In the case of these processes, the fibres are also supplied by a metering device through a feed chute to a fibre roller which is provided on its surface with a plurality of preferably conical pins. By rotating the fibre roller, the fibres are in turn deflected into a chute section and by virtue of the pins and an air flow generated by the pins the said fibres are accelerated to approximately the peripheral speed of the fibre roller. The chute section is defined by means of a partial section of the periphery of the fibre roller and an opposite-lying wall. An an outlet orifice of the chute section, the fibres exit out substantially in a horizontal direction of movement and are then deflected in an upward or downward direction in a deflection region of a pneumatic conveying device which, for example, can draw the fibres by means of a suction. In the deflection region, the fibres are glued by means of at least on spray nozzle which expels glue and air under pressurization.

In the case of these processes, the fibres are processed by the fibre roller as in the case of the first process discussed above, i.e. irregularities are disintegrated in the fibres which pass in a flow to the fibre roller and the fibres are stretched. This ensures that the fibres in the direction region are distributed extremely finely and thereby provide an extremely large contact surface for the glue which issues out of the spray nozzles.

In the case of these processes, it is also possible to provide metal baffle plates as in the case of the process in accordance with a previously discussed embodiment, thus yielding corresponding advantages.

The fibres can be deflected into a duct of a pneumatic conveying device, wherein in the deflection region the glue is sprayed onto the fibres by means of opposite-lying spray nozzles.

In the case of all processes in accordance with the invention, it can be provided that the speed, at which the fibres impinge upon the fibre roller, can be determined by adjusting the negative pressure prevailing in the feed chute.

Furthermore, all of the processes can be employed such that there are provided symmetrically arranged, opposite-lying fibre flows, in which the fibres are glued according to the same process, wherein the fibre flows collide with each other upon exiting the outlet orifice of the chute section. Such a double gluing process is particularly suitable for high fibre-throughputs of up to 30 t abs. dry/h. By virtue of the fact that after the application of glue the fibre flows collide with each other head-on, which preferably occurs at an inlet into an air conveying chute, the fibres are subsequently mixed in an effective manner.

Immediately following on from the gluing processes described, it is also possible to sift the fibres. In this case, the different trajectory of the particles having a different mass upon exiting the chute section is utilized for air fibre sifting.

However, the respective gluing process in accordance with the invention can also be followed by an independent process of fibre sifting. This type of air fibre sifting process can be, for example, the fibre sifting process described in the German patent application 100 25 177.3 which is preceded by a process of disintegrating irregularities in a fibre flow. However, the process of forming a fibre mat can also follow, e.g. according to the process described in the said German patent application.

Furthermore, it is possible to glue the fibres in a stepwise manner such that in one of the above-described gluing processes, which do not include the directly subsequent fibre sifting process, the fibres are initially glued to a desired extent which is reduced with respect to the end gluing state, and in a further subsequent gluing process, which as described above includes direct sifting of fibres, the said fibres are glued once again in order to achieve the desired end state of the gluing procedure. For example, in the case of a desired solid resin proportion of 10% based upon absolutely dry fibres, 5% solid resin can be allocated to the first gluing step without fibre sifting and 5% solid resin can be allocated to the second gluing state including fibre sifting. The advantages of this process of gluing fibres in steps are that less glue throughput is required for each gluing step and thus for each individual gluing device, which serves to reduce the formation of lumps caused by fibres and glue, and also that the glue is distributed in an improved manner onto the fibres by virtue of multiple gluing and mixing and the internal contamination of the individual gluing device is reduced by means of a reduced glue-fibre ratio per gluing step.

It is also possible to provide stepwise gluing in more than two steps. Furthermore, gluing can also be performed e.g. in two gluing steps, in which a sifting process does not follow on directly in each case.

With respect to the device, the aforementioned object is achieved by the features of devices for gluing dried fibres which are designated for the production of fibreboards. In one such embodiment, the device includes a fibre-metering device having an outlet. Below the outlet is a feed chute having an outlet orifice and which can be subjected to negative pressure and which extends to a rotatable fibre roller which has on its surface a plurality of pins. The fibres impinging upon the fibre roller are deflected by means of the pins, and are directed along a chute section. This chute section is defined by a partial section of the periphery of the fibre roller and an opposite-lying wall, and extends from the outlet orifice of the feed chute in the rotational direction of the fibre roller and has an outlet orifice for the fibres. The fibres are accelerated to approximately the peripheral speed of the fibre roller by means of the pins and an air flow generated by the pins, wherein by reason of the centrifugal force the fibres are removed from the fibre roller and come to lie against a section of the wall, without yet coming into contact with the pins. The chute section is further defined by virtue of means for gluing the fibres which means are disposed in the region of the wall section or adjacent to one end of the wall section.

Another embodiment is similar to the device just described. Here, however, in the chute section there is disposed at least one metal baffle plate which is inclined in a ramp-like manner and which brings the fibres once again into contact with the pins, wherein the fibres then lie against a further section of the wall by reason of the centrifugal force. Additionally, the chute section is also defined by virtue of means for gluing the fibres which means are disposed in the region of one of the wall sections, between two wall sections or adjacent to one end of the last wall section in the flow direction of the fibres.

In these two cases above, essentially the same advantages are achieved as mentioned previously in conjunction with the previously described methods.

With respect to the device, the object is also achieved by virtue of the features of additional devices for gluing dried fibres which are designated for the production of fibreboards. Here the device includes a fibre-metering device having an outlet, below which is a feed chute which can be subjected to negative pressure and which extends from the outlet to a rotatable fibre roller which has on its surface a plurality of pins. The fibres impinging upon the fibre roller are deflected by means of the pins, and directed along a chute section which has an outlet orifice. The chute section is defined by a partial section of the periphery of the fibre roller and an opposite-lying wall and extends from an outlet orifice of the feed chute in the rotational direction of the fibre roller. The fibres are accelerated to approximately the peripheral speed of the fibre roller by means of the pins and an air flow generated by the pins. The fibres are expelled through the outlet orifice substantially in a horizontal movement direction. Disposed adjacent to the outlet orifice of the chute section is an inlet orifice of a pneumatic conveying device, in which the fibres are deflected in a downward or upward direction. Spray nozzles are disposed in a deflection region of the pneumatic conveying device for gluing the fibres. In this case, essentially the same advantages are achieved as mentioned previously in conjunction with processes carried out by these devices. Additional preferred embodiments of the device are provided herein.

Means for sifting the glued fibres can be used for the above-described stepwise gluing of the fibres. A gluing device without fibre sifting is followed by a gluing device with fibre sifting.

All of the devices in accordance with the invention can also be designed in a similar manner such that the fibres are supplied at the lower end of the chute section and exit at the upper end. The metering device is disposed below the fibre roller and the fibres are drawn to the chute section by virtue of the suction effect of the fibre roller.

The invention will be explained in detail hereinunder with reference to exemplified embodiments, wherein reference will be made to the Figures, in which FIG. 1*a* shows schematically a partial view of a gluing device having glue slot nozzles, in which the glued fibres are drawn off by suction in a downward direction.

Figure 1B:
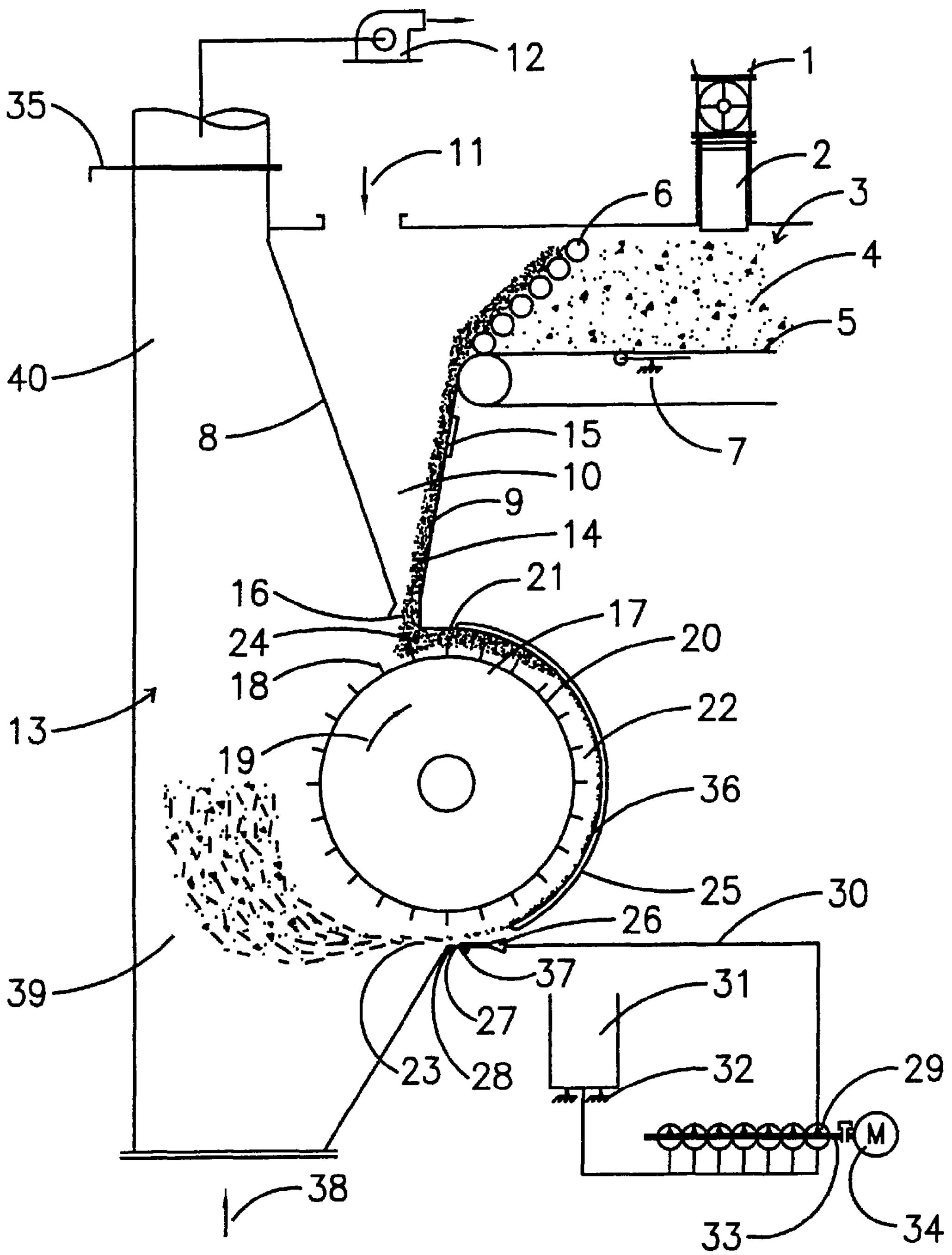
Figure 1C:
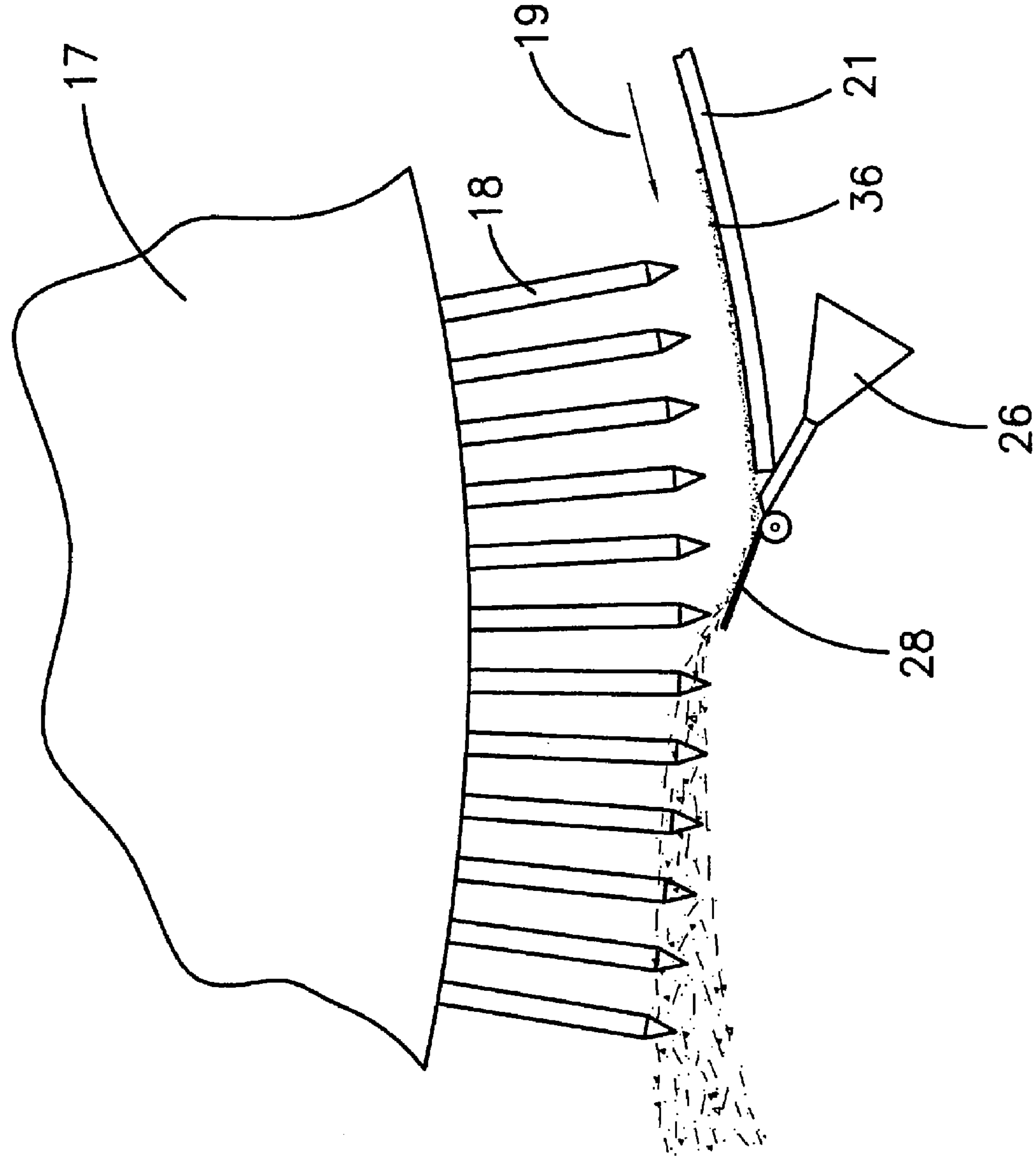
Figure 1D:
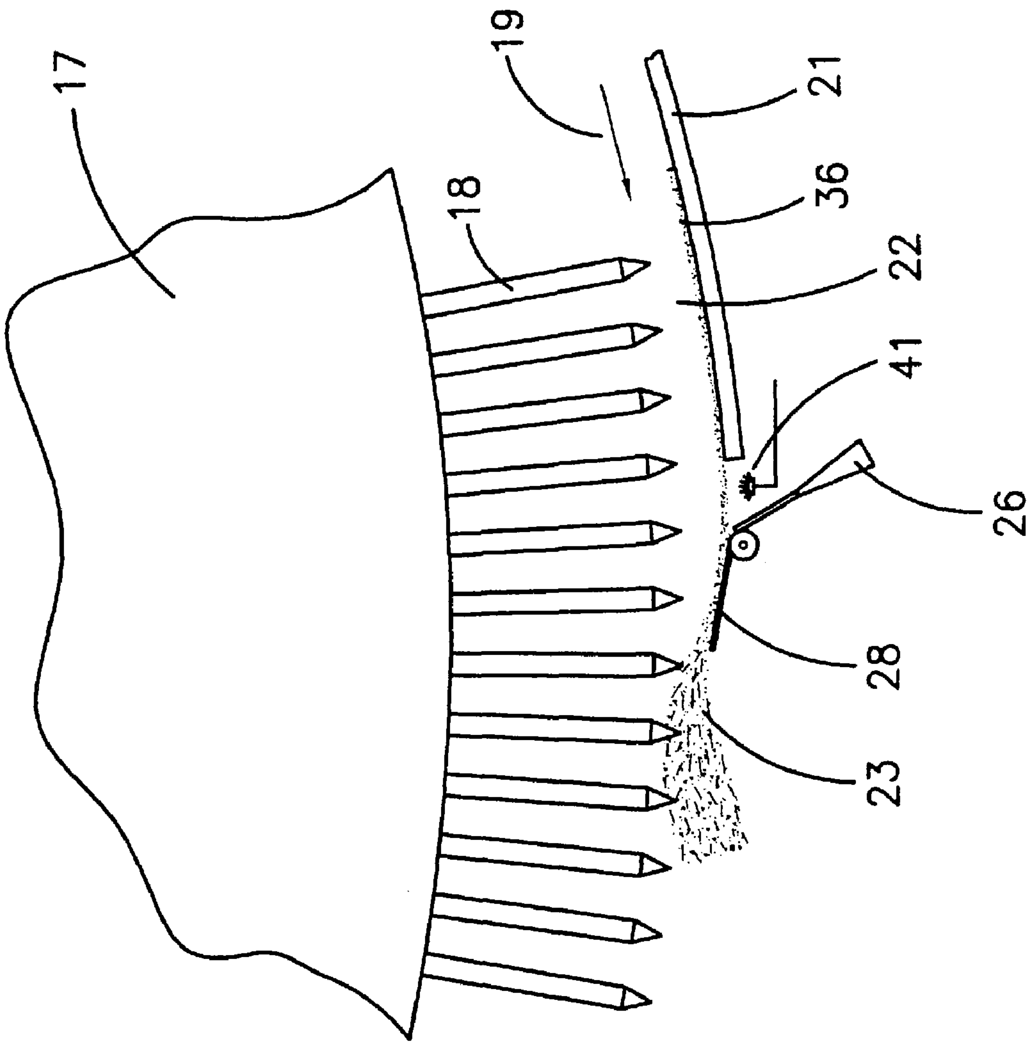
Figure 1E:
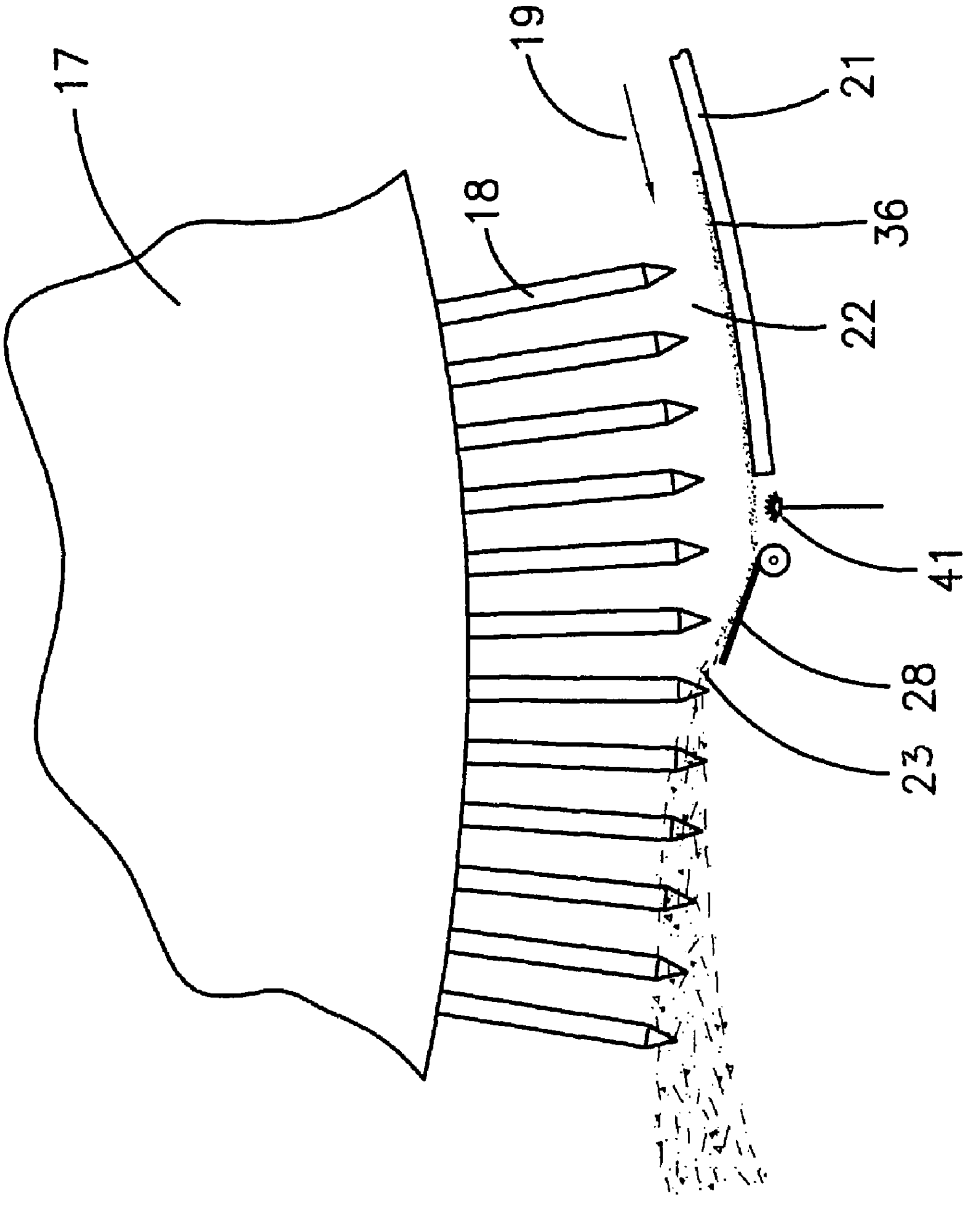
Figure 1F:
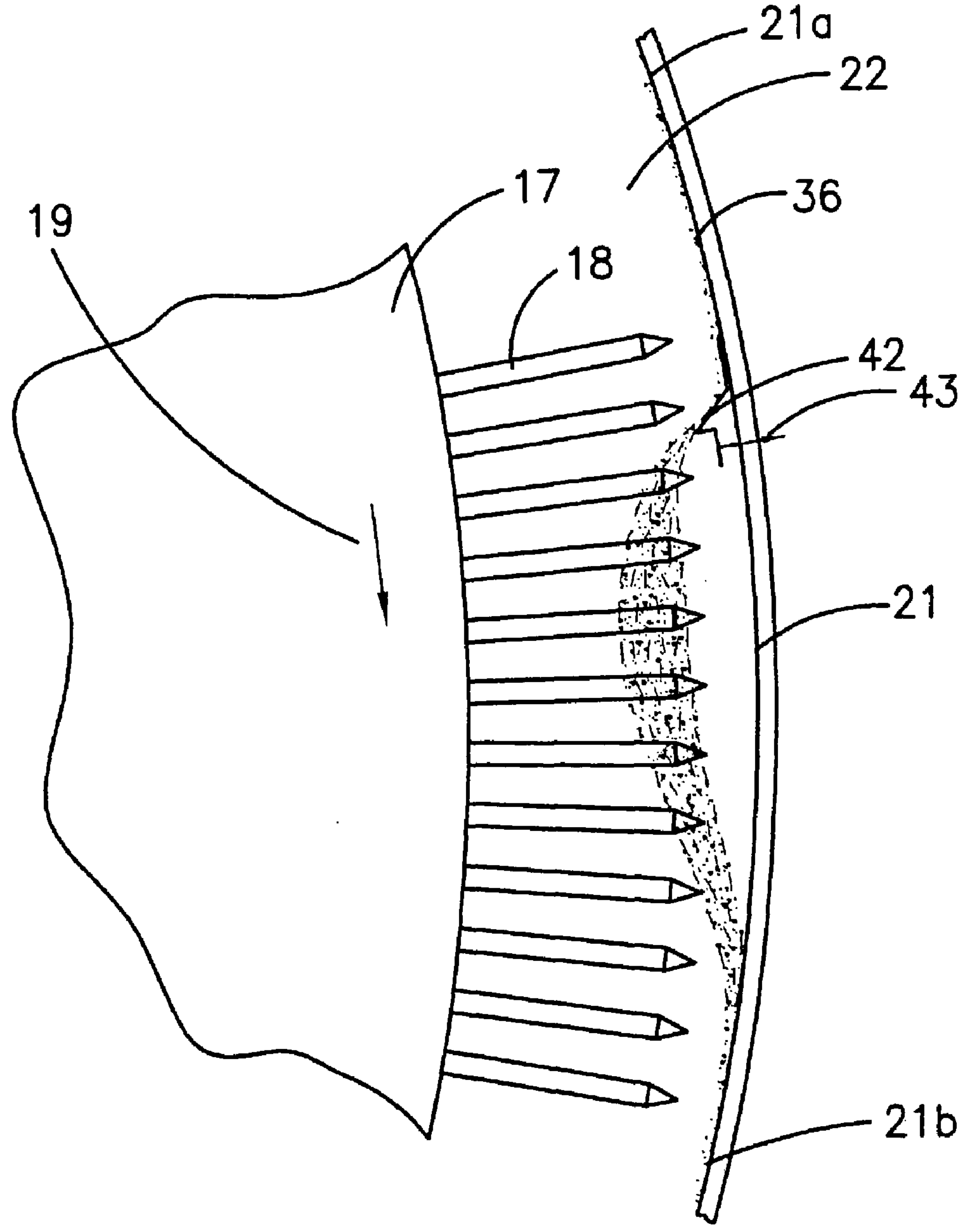
Figure 2A:
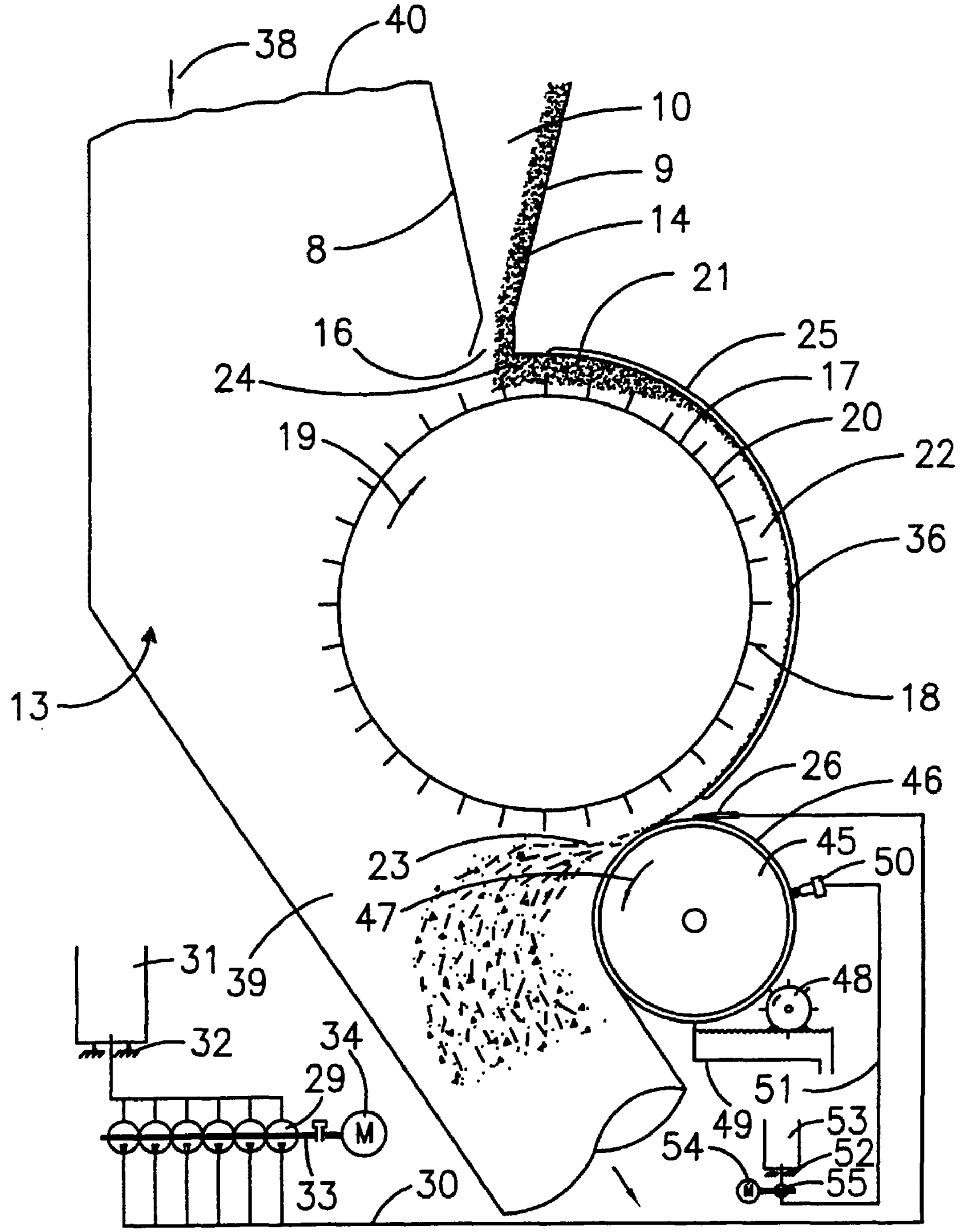
Figure 2B:
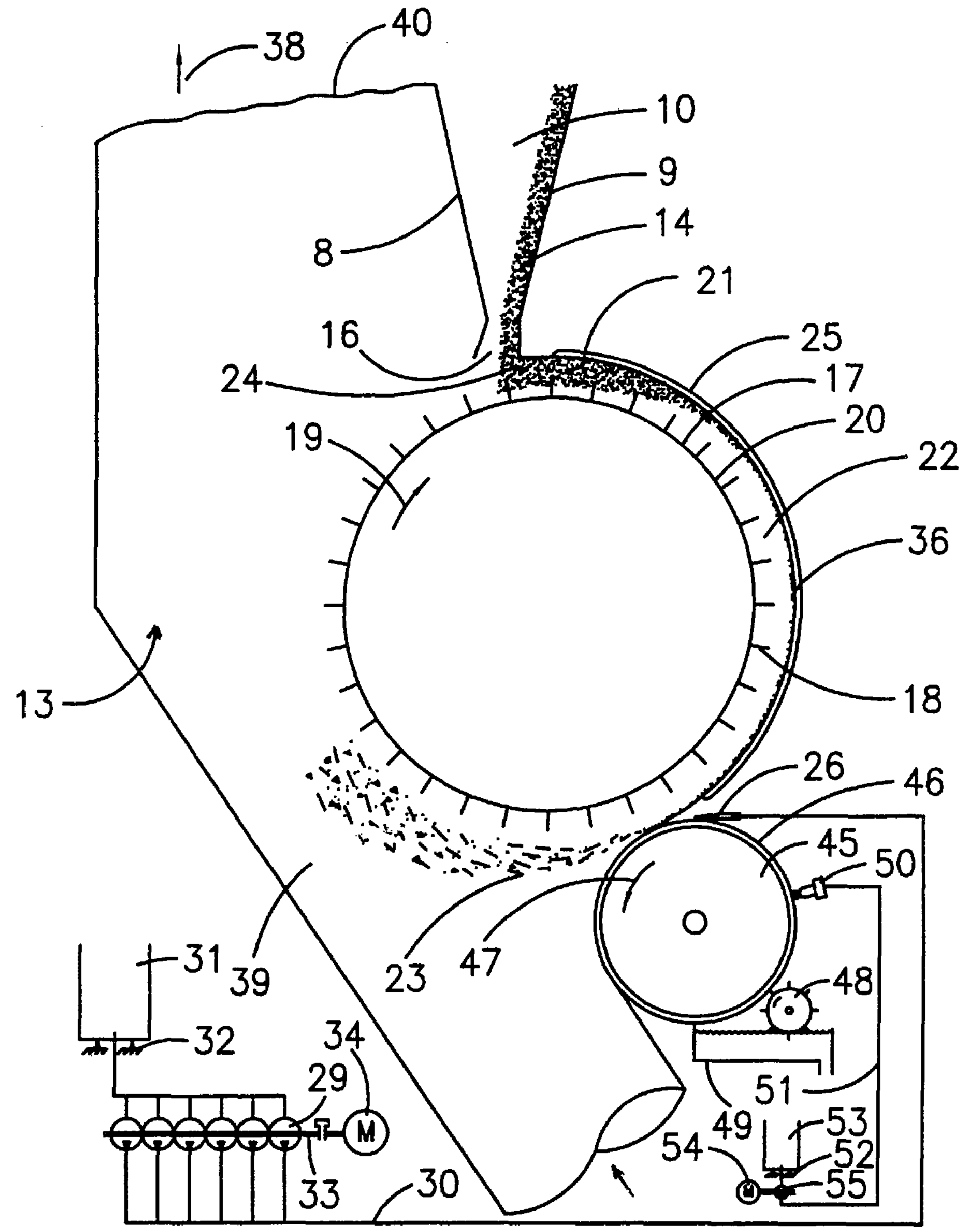
Figure 2C:
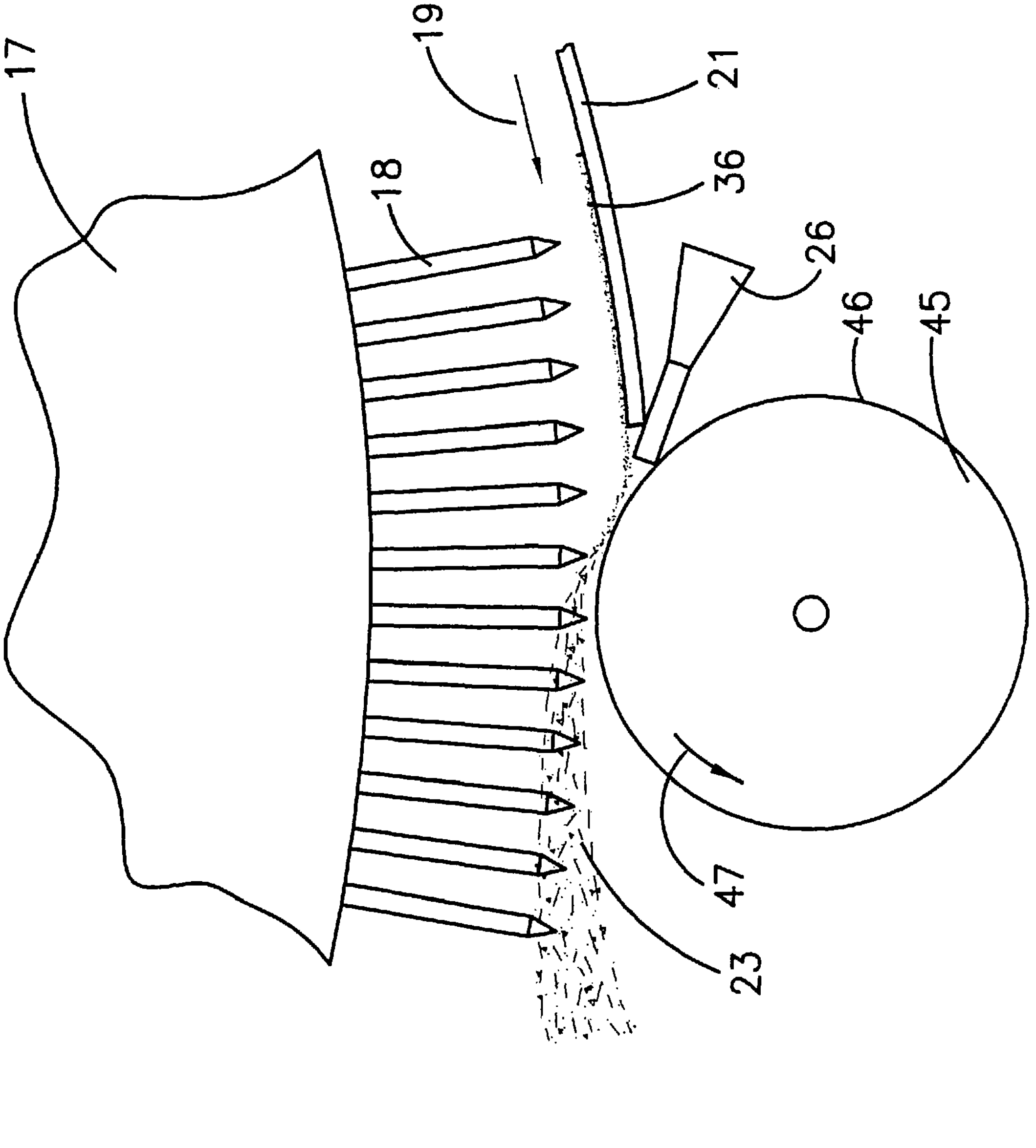
Figure 2D:
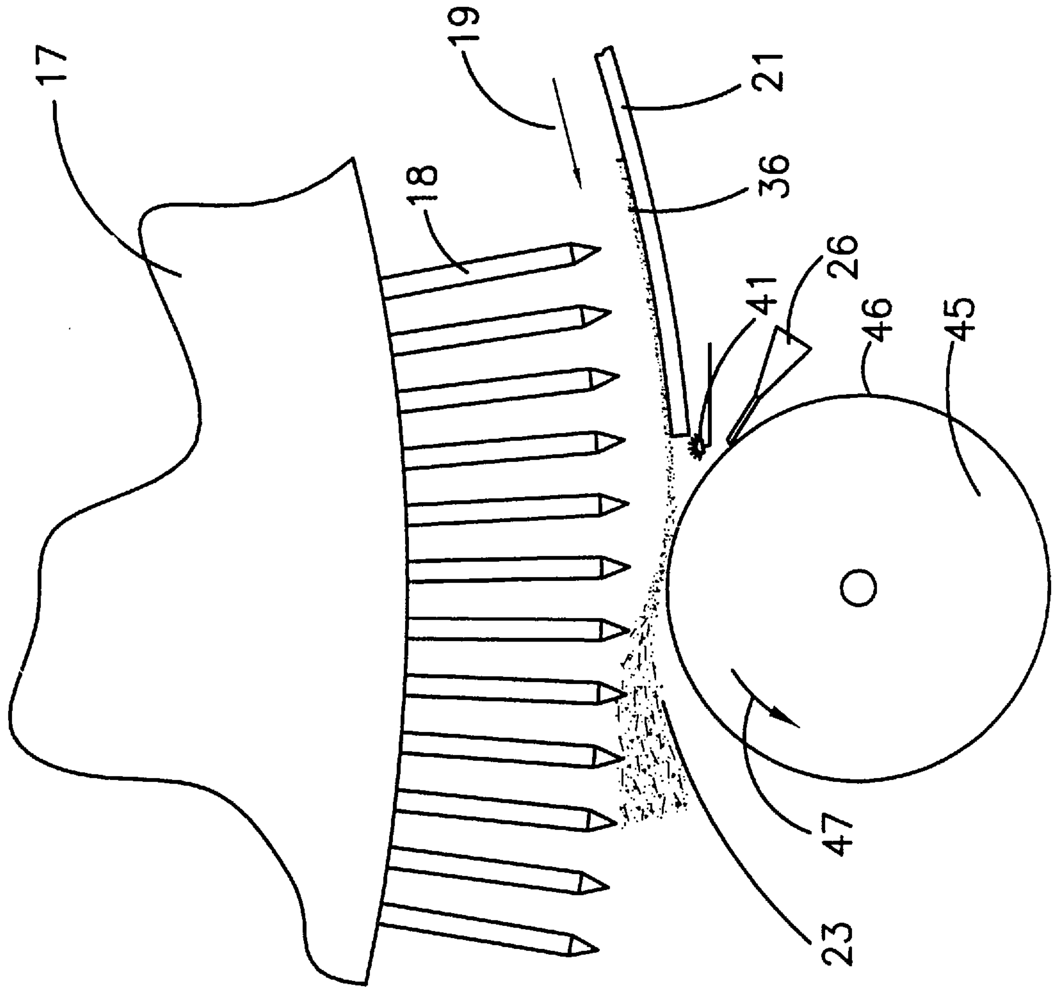
Figure 2E:
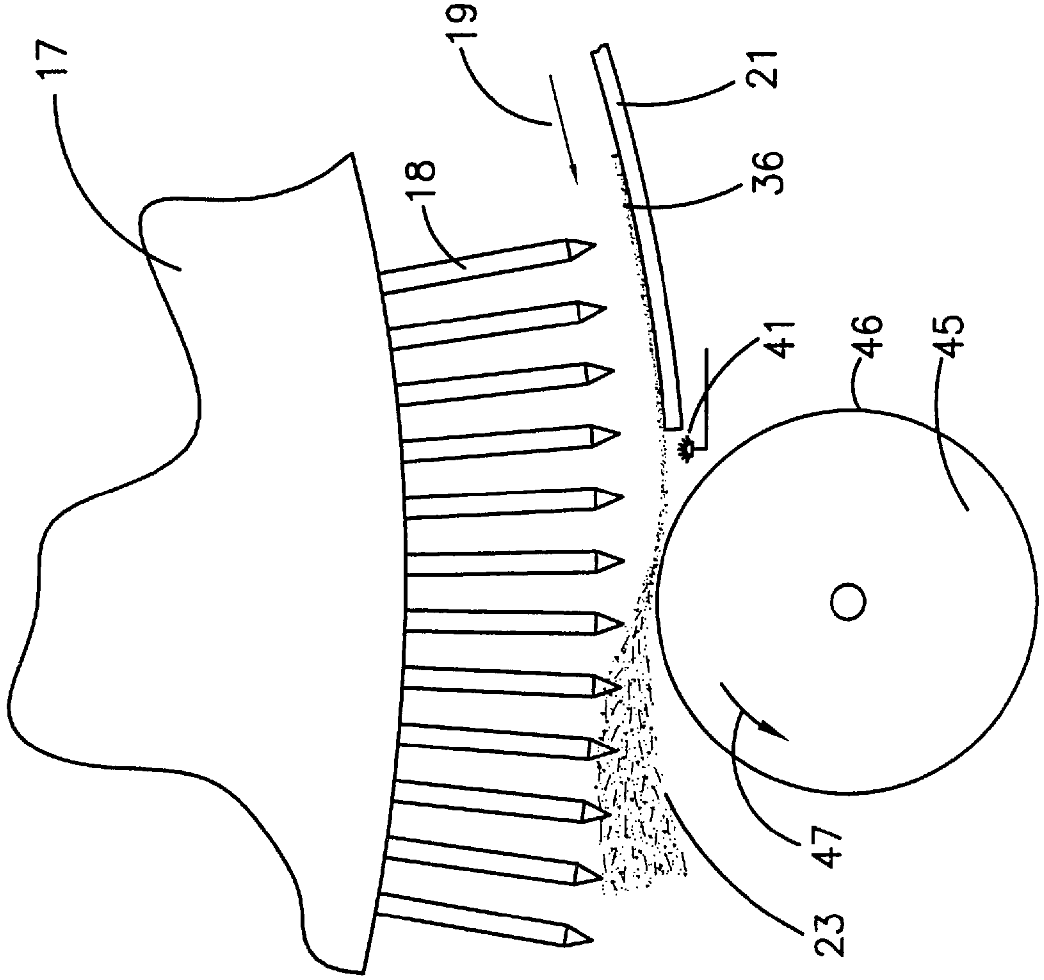
Figure 3A:
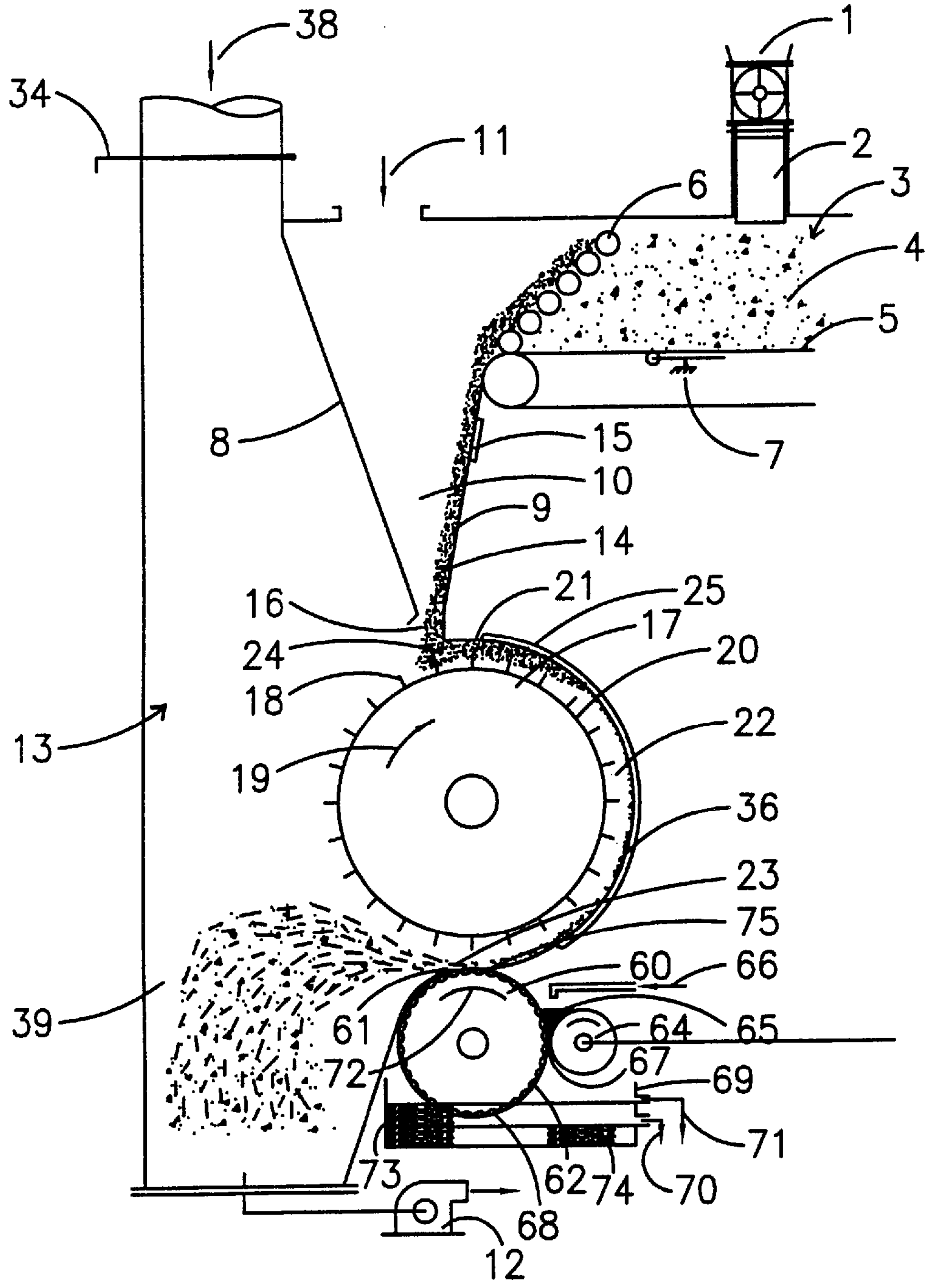
Figure 3B:
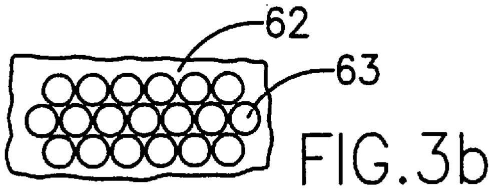
Figure 3C:
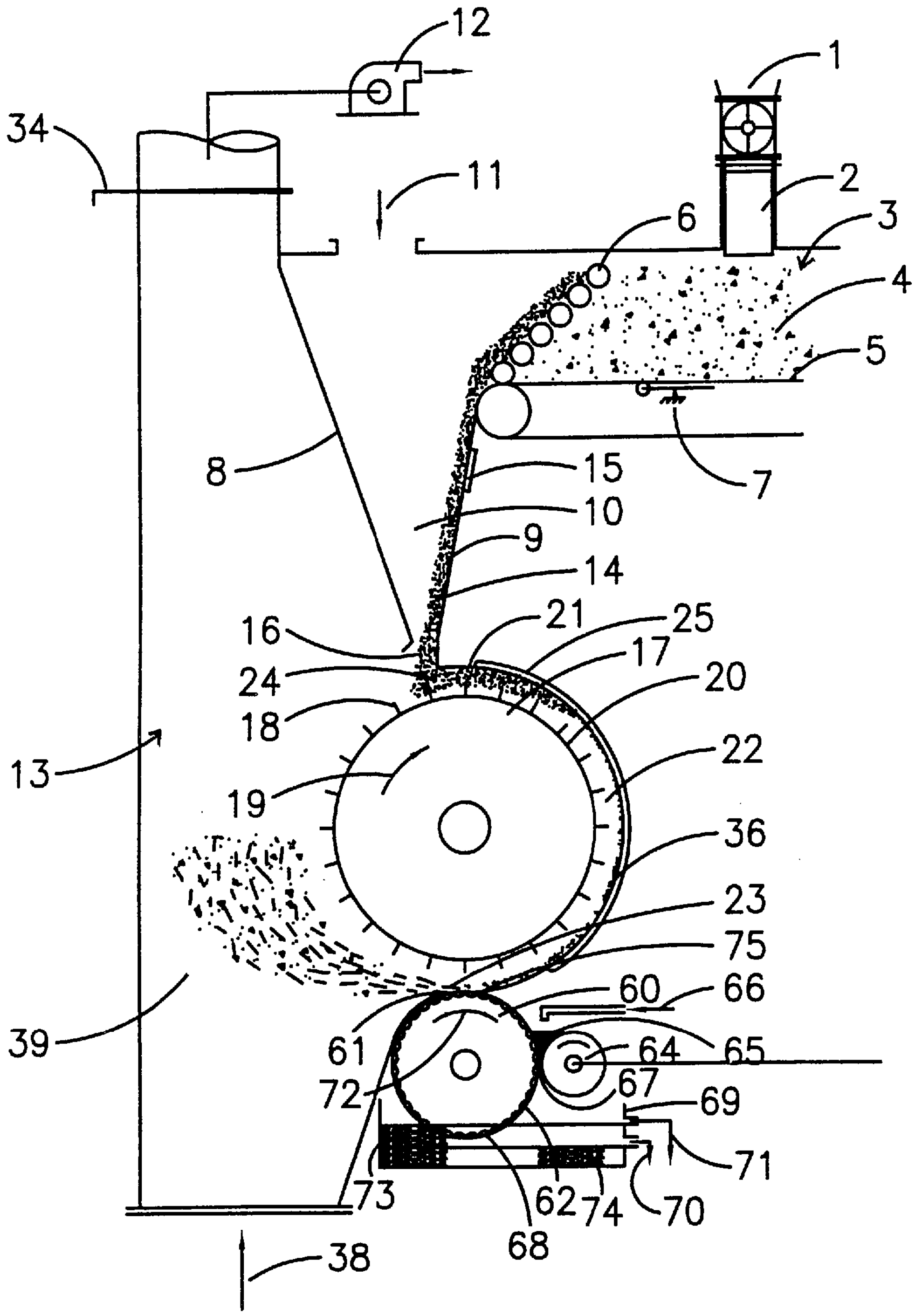
Figure 3D:
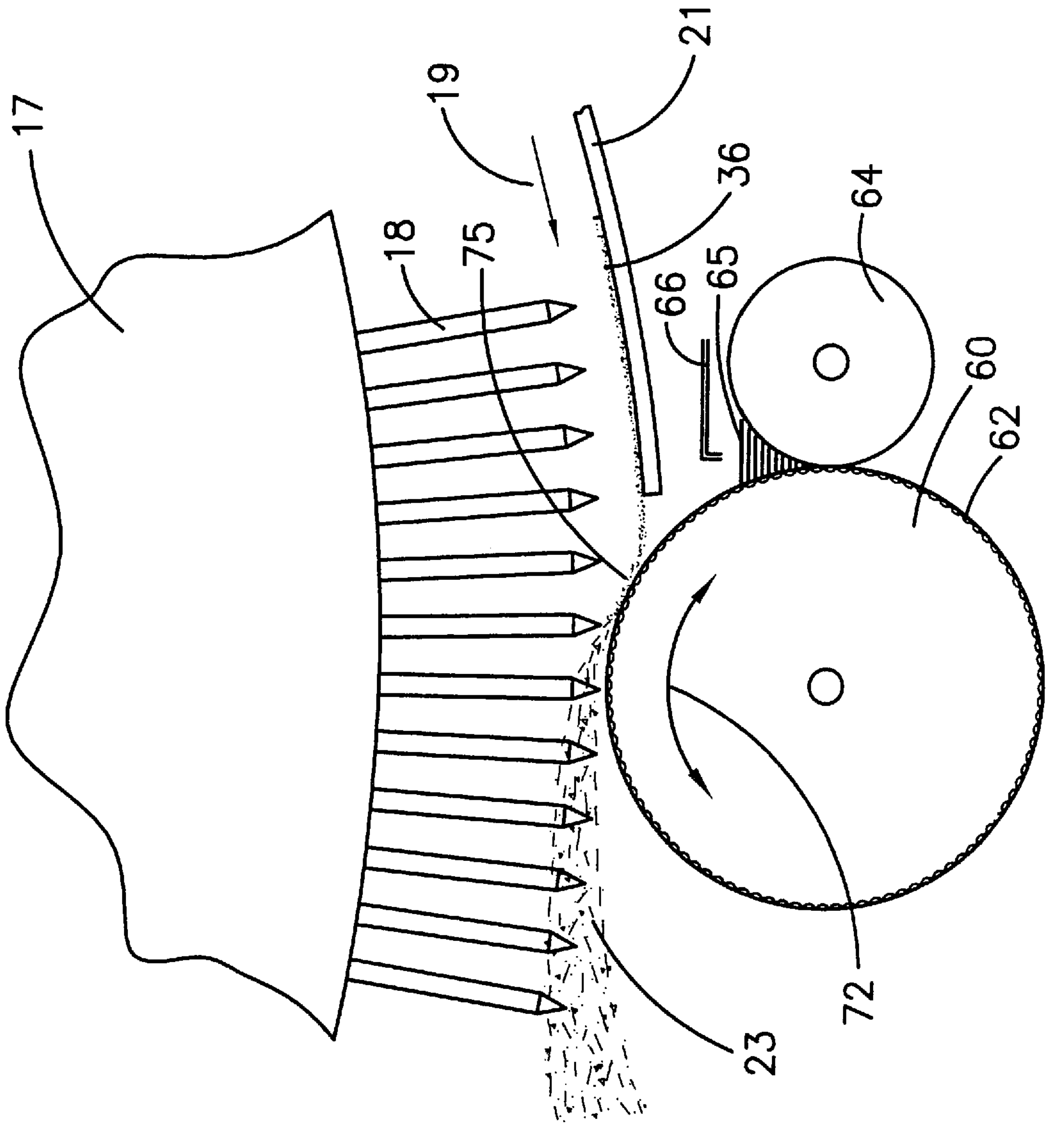
Figure 4A:
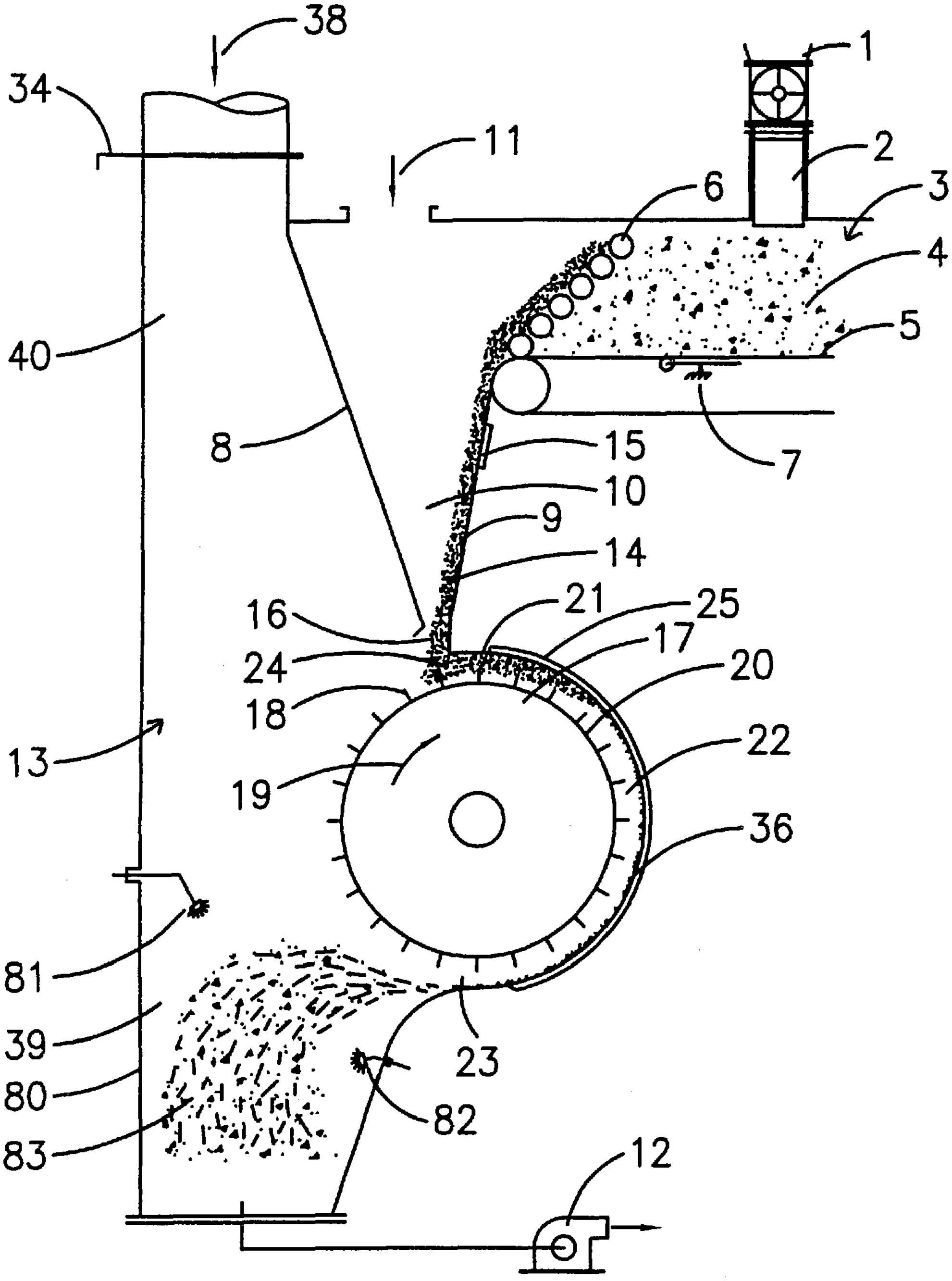
Figure 4B:
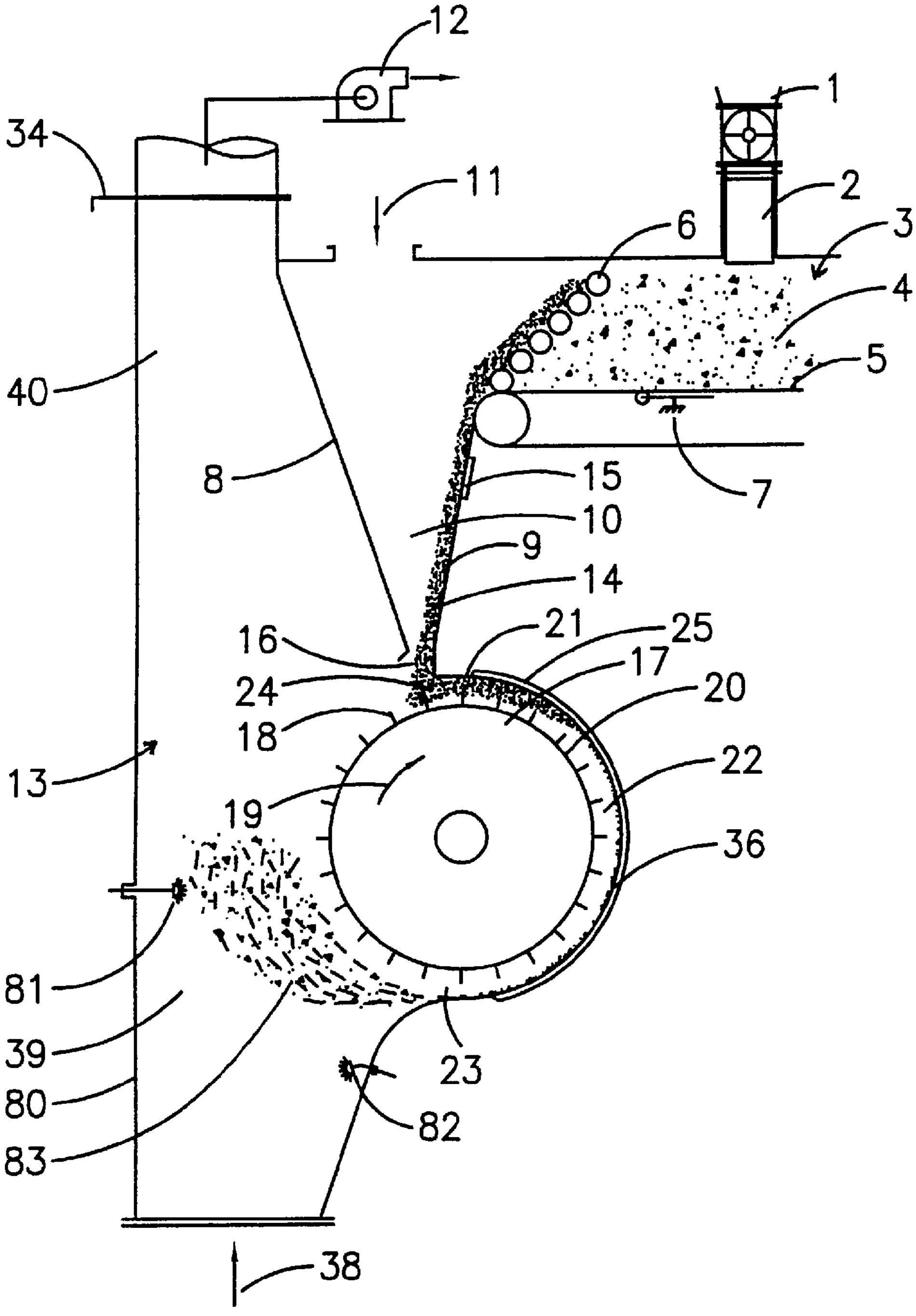
Figure 5A:
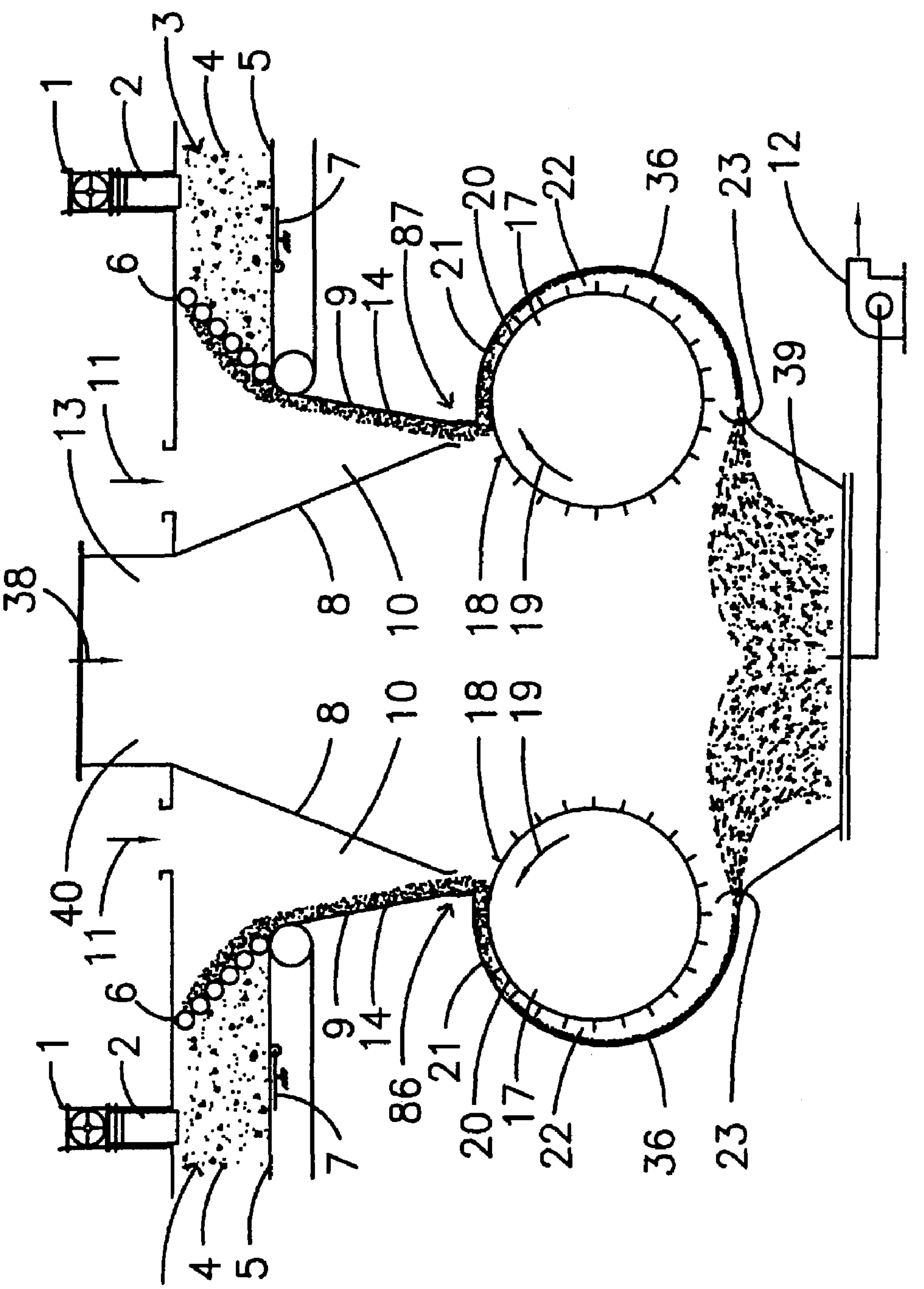
Figure 5B:
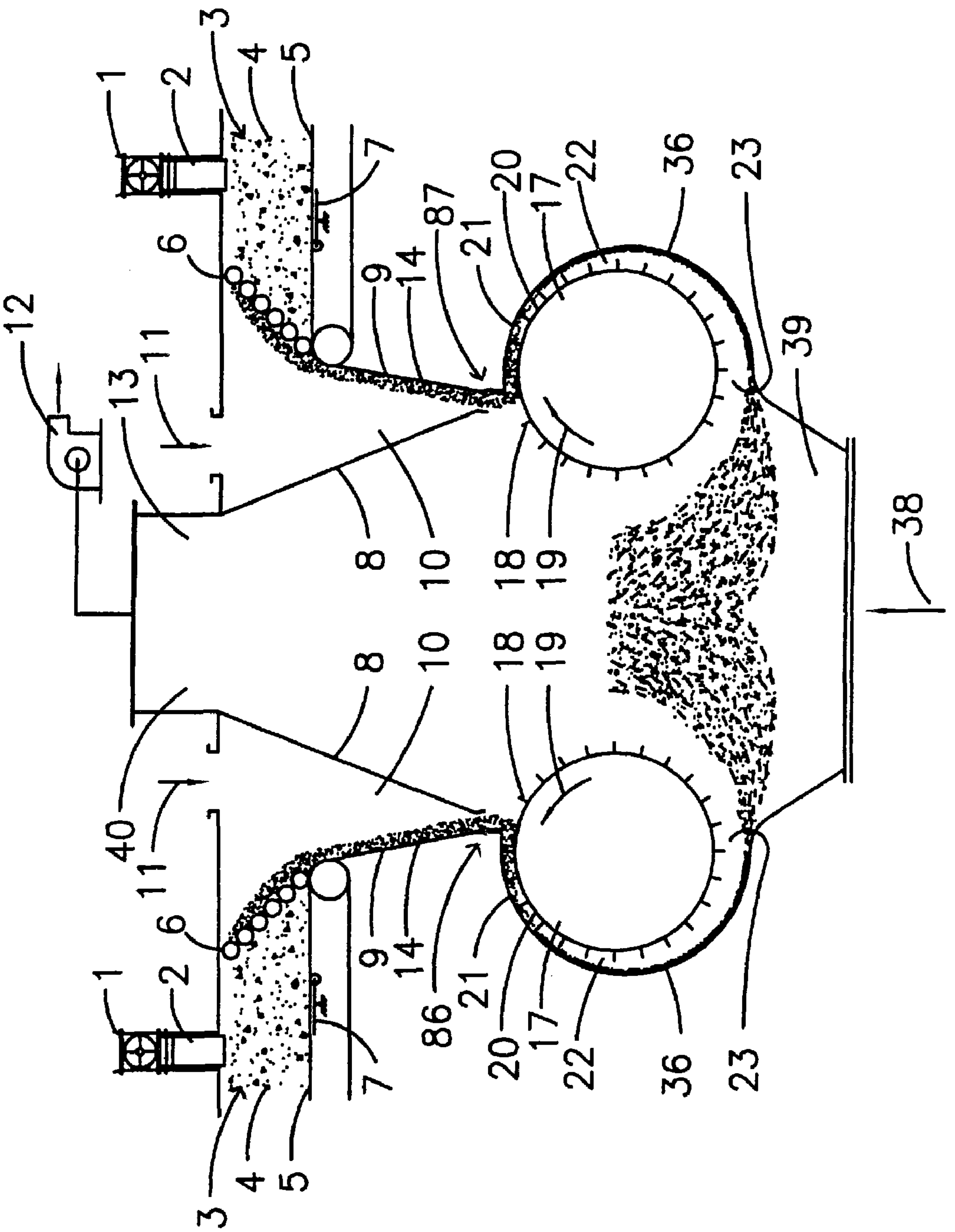
Figure 6A:
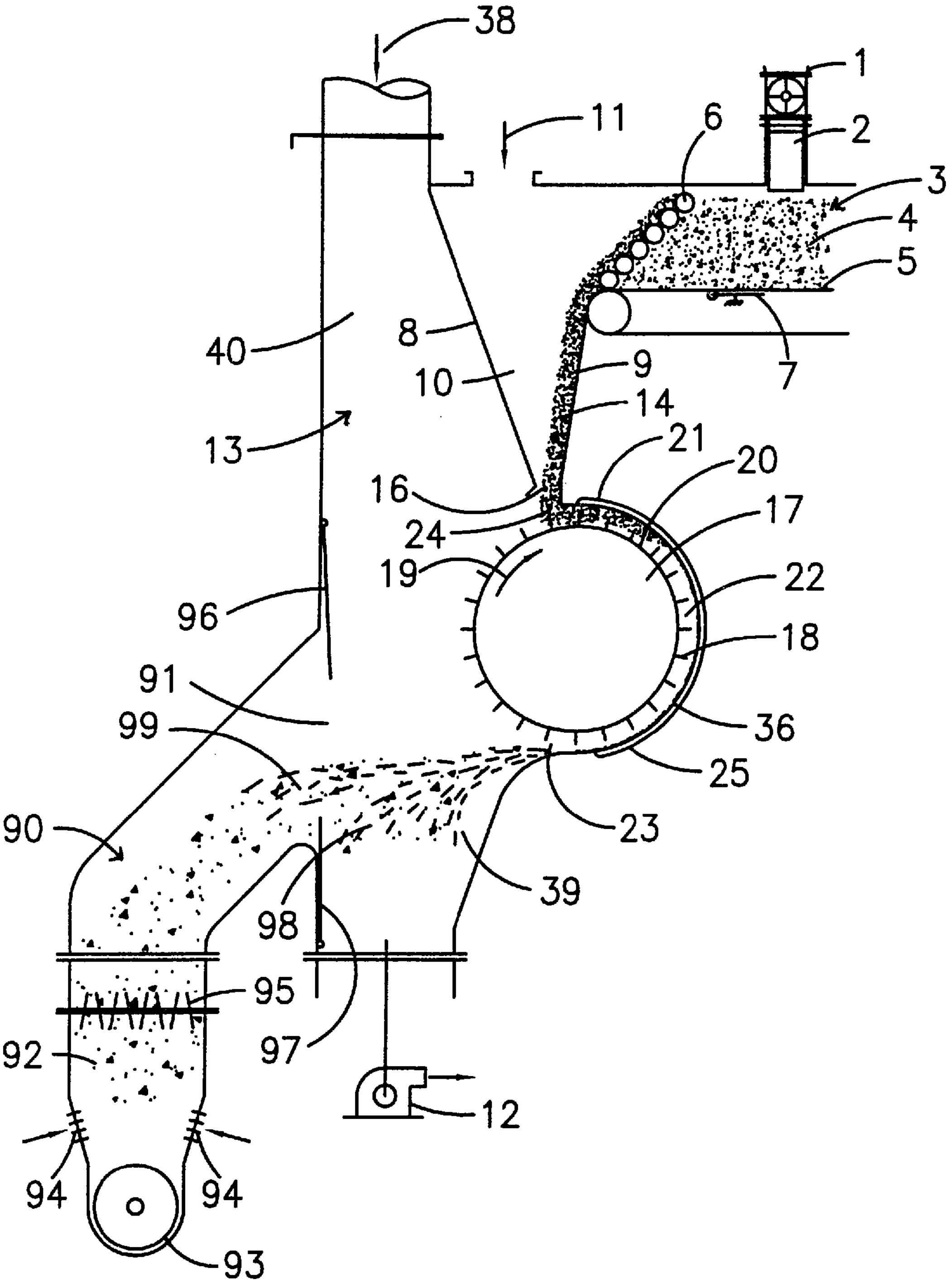
Figure 6B:
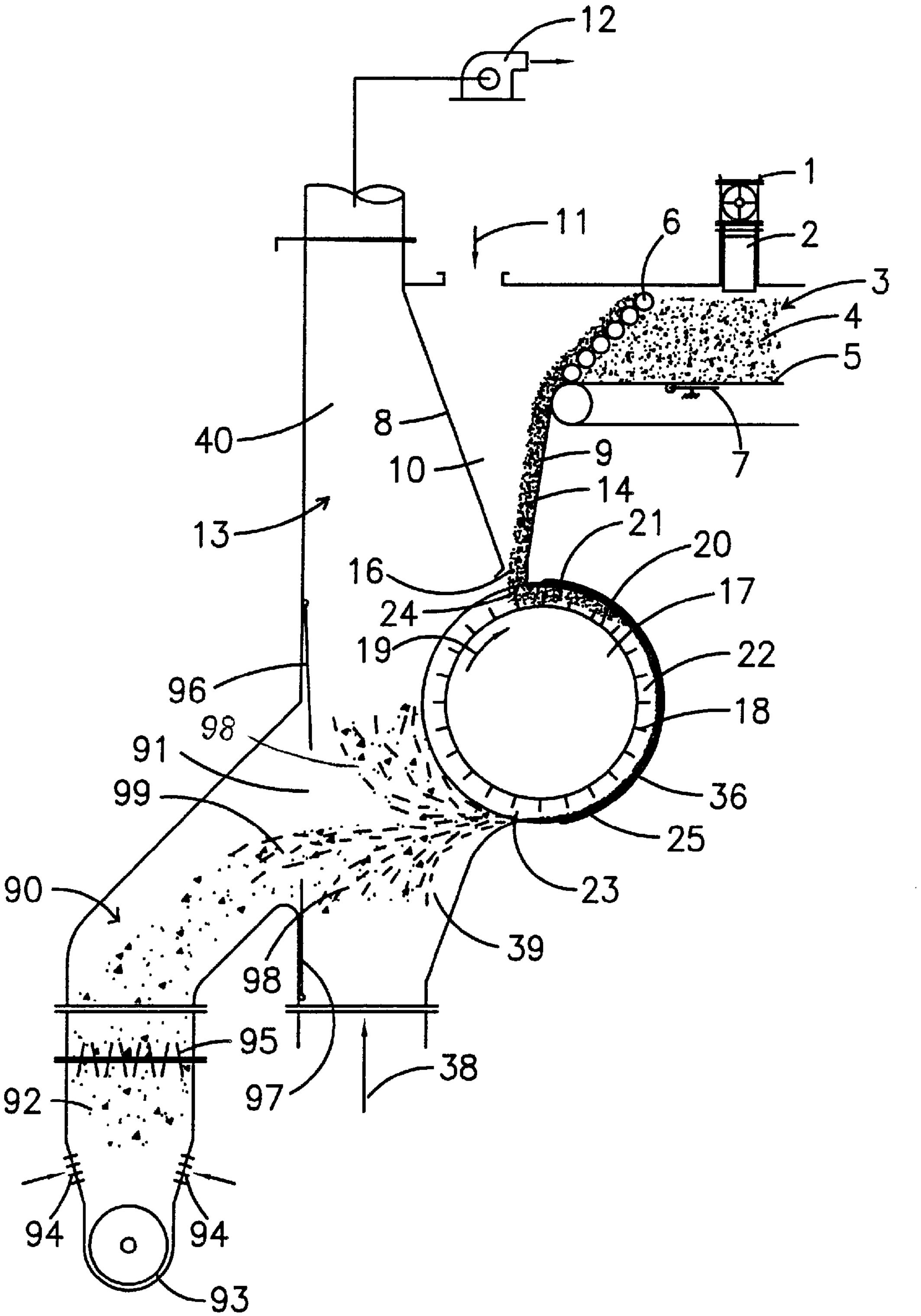
Figure 7B:
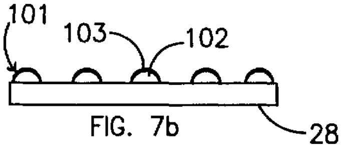
Figure 7D:
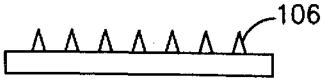
Figure 7F:
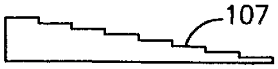
Figure 7A:
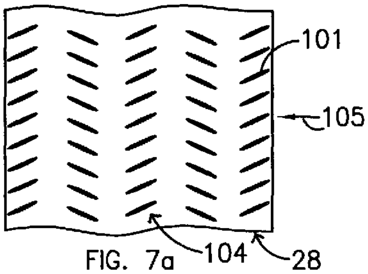
Figure 7C:
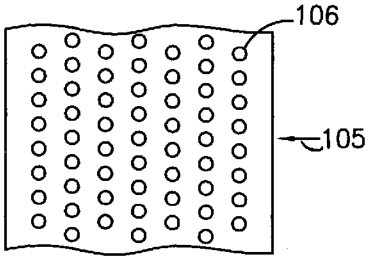
Figure 7E:
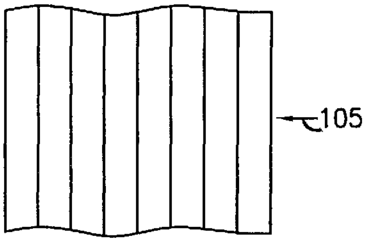
Figure 8A:
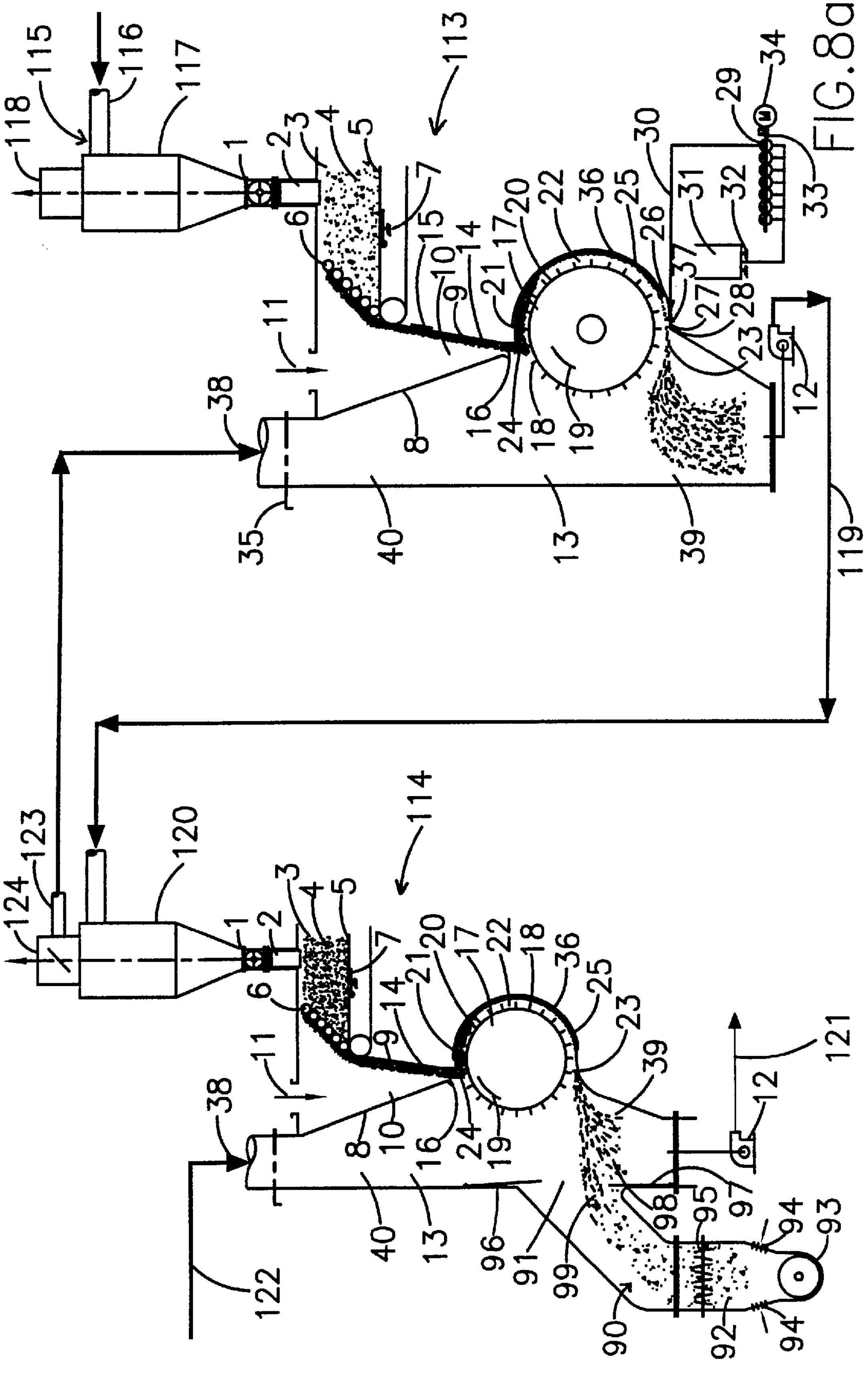
Figure 8B:
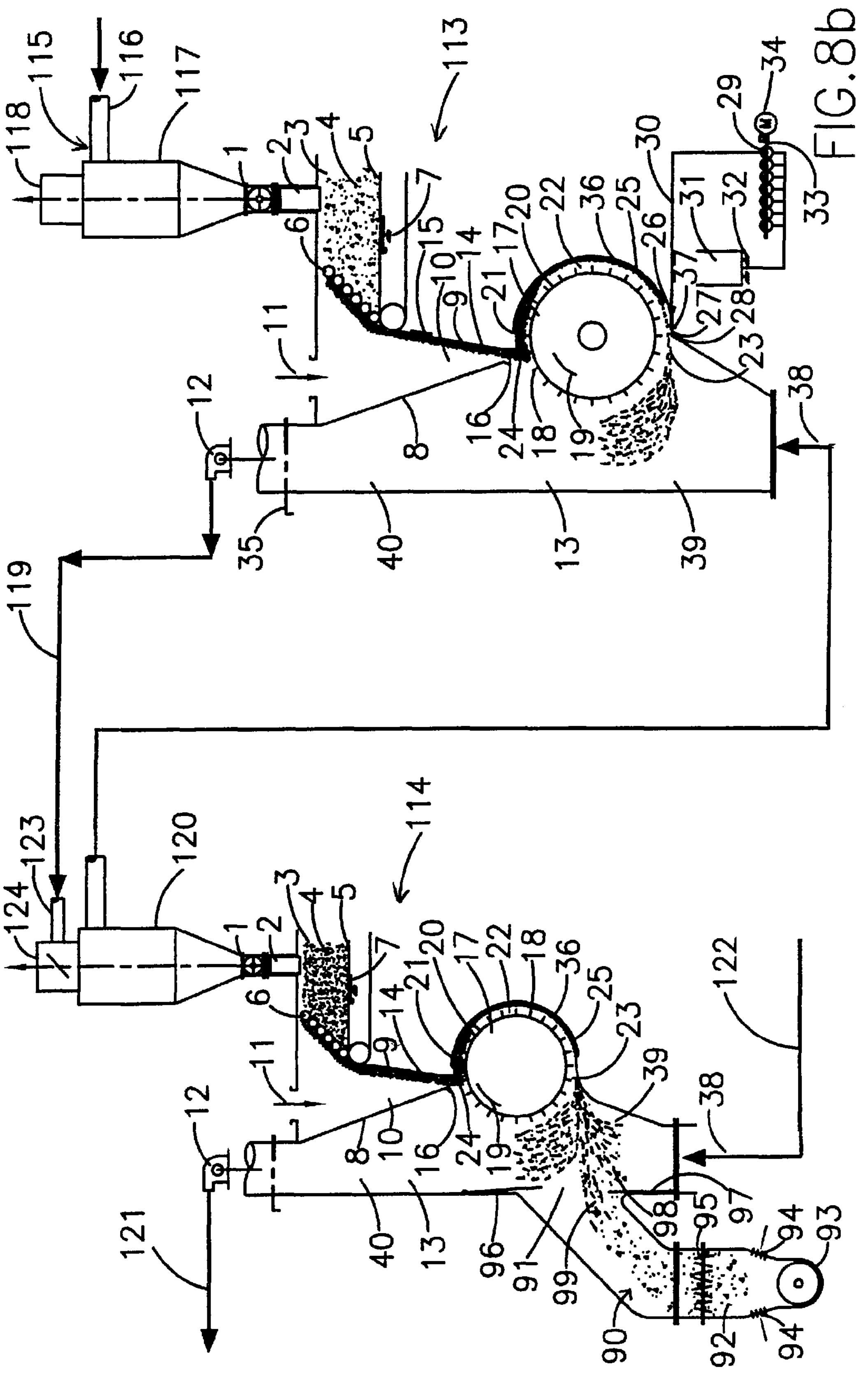
Figure 8C:
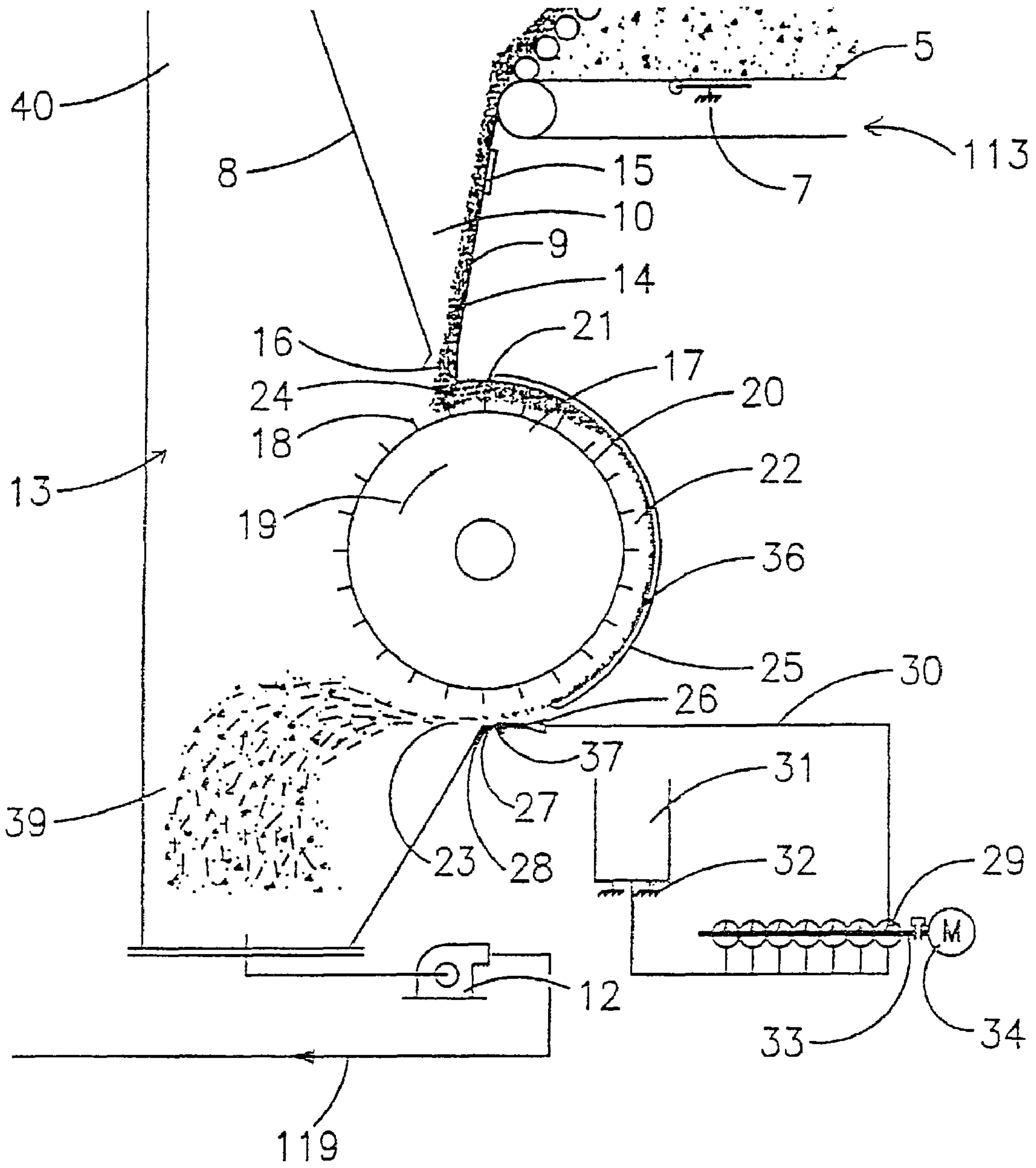
Figure 8D:
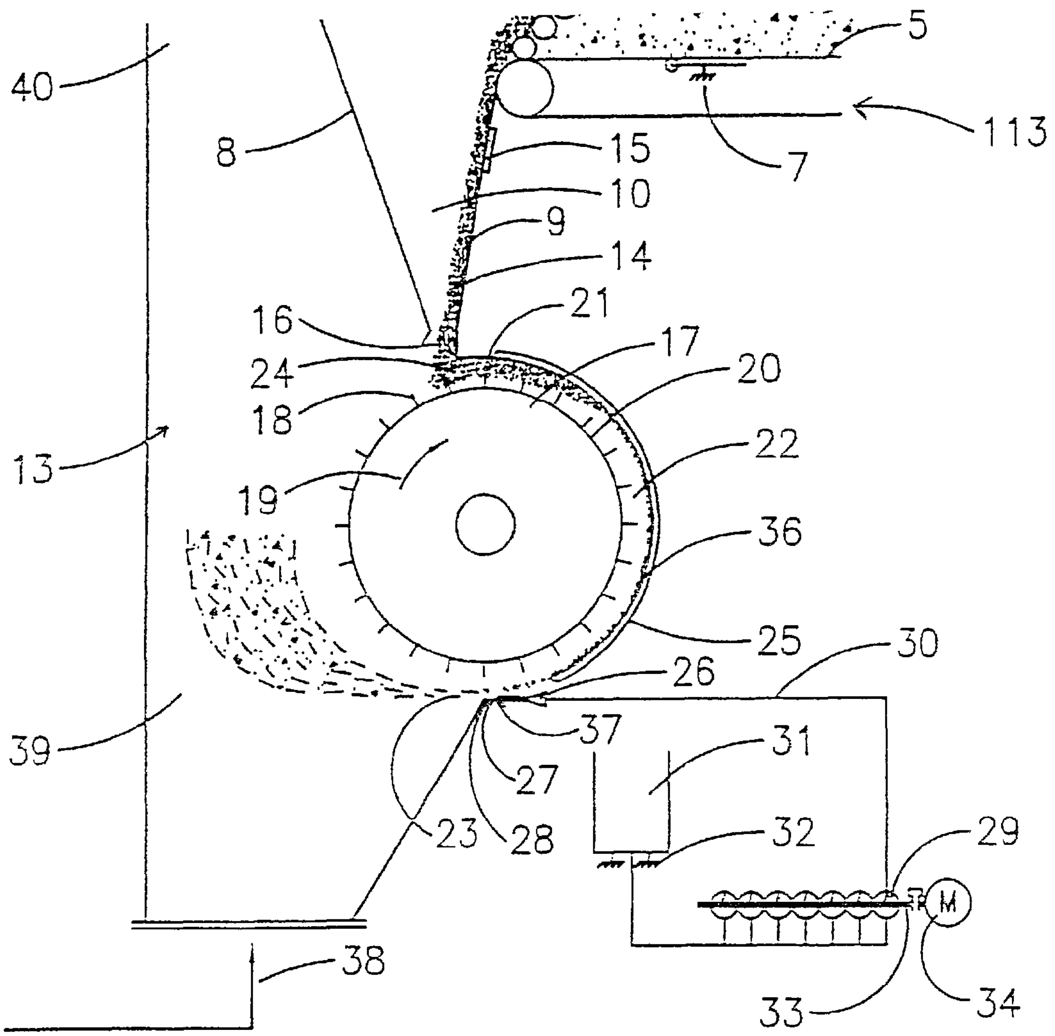

FIG. 1*b* shows schematically a partial view of a gluing device having glue slot nozzles, in which the glued fibres are drawn off by suction in an upward direction, FIG. 1*c* shows schematically a partial view of a gluing device which deviates from the gluing device as shown in FIG. 1*a* merely in relation to the region of a gluing board, FIG. 1*d* shows schematically a partial view of a gluing device which deviates from the gluing device as shown in FIG. 1*a* merely in relation to the region of the outlet orifice of the chute section, FIG. 1*e* shows schematically a partial view of a gluing device which deviates from the gluing device as shown in FIG. 1*a* merely in relation to the region of the outlet orifice of the chute section, FIG. 1*f* shows schematically a partial view of the chute section of a gluing device which with the exception of metal baffle plates in the chute section is formed in the manner of one of the gluing devices as shown in FIGS. 1*a* to 1*e*, FIG. 2*a* shows schematically a partial view of a gluing device having glue slot nozzles and a rotatable gluing roller, in which the glued fibres are drawn off by suction in a downward direction, FIG. 2*b* shows schematically a partial view of a gluing device having glue slot nozzles and a rotatable gluing roller, in which the glued fibres are drawn off by suction in an upward direction, FIG. 2*c* shows schematically a partial view of a gluing device which deviates from the gluing device as shown in FIG. 2*a* merely in relation to the region of the gluing roller, FIG. 2*d* shows schematically a partial view of a gluing device which deviates from the gluing device as shown in FIG. 2*a* merely in relation to the region of the outlet orifice of the chute section, FIG. 2*e* shows schematically a partial view of a gluing device which deviates from the gluing device as shown in FIG. 2*a* merely in relation to the region of the outlet orifice of the chute section, FIG. 3*a* shows schematically a partial view of a gluing device having a glue roller, in which the glued fibres are drawn off by suction in a downward direction, FIG. 3*b* shows schematically a section of a surface profile of the glue roller as shown in FIG. 3*a*, FIG. 3*c* shows schematically a partial view of a gluing device having a glue roller, in which the glued fibres are drawn off by suction in an upward direction, FIG. 3*d* shows schematically a partial view of a gluing device which deviates from the gluing device as shown in FIG. 3*a* merely in relation to the region of the glue roller, FIG. 4*a* shows schematically a partial view of a gluing device having glue spray nozzles, in which the glued fibres are drawn off by suction in a downward direction, FIG. 4*b* shows schematically a partial view of a gluing device having glue spray nozzles, in which the glued fibres are drawn off by suction in an upward direction, FIG. 5*a* shows schematically a partial view of a gluing device, in which there are provided two symmetrically arranged, opposite-lying fibre flows and the glued fibres are drawn off by suction in a downward direction, FIG. 5*b* shows schematically a partial view of a gluing device, in which there are provided two symmetrically arranged, opposite-lying fibre flows and the glued fibres are drawn off by suction in an upward direction, FIG. 6*a* shows schematically a partial view of a gluing device having an integrated fibre sifting device, in which the glued fibres are drawn off by suction in a downward direction, FIG. 6*b* shows schematically a partial view of a gluing device having an integrated fibre sifting device, in which the glued fibres are drawn off by suction in an upward direction, FIG. 7*a* shows schematically a plan view of a section of a fin-like profile of the surface of the gluing board as shown in FIG. 1 or of the gluing roller as shown in FIG. 2, FIG. 7*b* shows a sectional view of the fin-like profile as shown in FIG. 7*a*, FIG. 7*c* shows schematically a plan view of a section of a nail-like profile of the surface of the gluing board as shown in FIG. 1 or of the gluing roller as shown in FIG. 2, FIG. 7*d* shows a sectional view of the nail-like profile as shown in FIG. 7*c*, FIG. 7*e* shows schematically a plan view of a section of a step-like profile of the surface of the gluing board as shown in FIG. 1 or of the gluing roller as shown in FIG. 2, FIG. 7*f* shows a sectional view of step-like profile as shown in FIG. 7*e*, FIG. 8*a* shows schematically a partial view of a gluing device for stepwise gluing, in which the glued fibres are drawn off by suction in each case in a downward direction, FIG. 8*b* shows schematically a partial view of a gluing device for stepwise gluing, in which the glued fibres are drawn off by suction in each case in an upward direction, FIG. 8*c* shows an enlarged section of FIG. 8*a*, and FIG. 8*d* shows an enlarged section of FIG. 8*b*.

The gluing device as shown in FIG. 1*a* comprises a transverse fibre distributing device 2 which is connected to an outlet 1 of a fibre dryer [not illustrated]. Connected to the transverse distributing device 2 is a metering bin 3 which is filled uniformly with dried wood fibres 4 by means of the transverse distributing device 2. By means of a base belt 5, the wood fibres 4 are supplied to a metering bin outlet having discharge rollers 6. The discharge rollers 6 serve to eliminate any relatively large clumps of fibres 4. The base belt 5 passes via a weighing device 7 which continuously records the current fibre throughput weight (weight per unit of time).

The fibres 4 pass from the metering bin outlet into a feed chute 10 which is configured from two forming-walls 8 and 9 and which comprises an air-supply 11 at an upper end.

By means of a fan 12 of a pneumatic conveying device 13, which in FIG. 1*a* is only partially illustrated having a partial section associated with the gluing device, a mixture of fibres and air is drawn-in in the feed chute 10, wherein the fibres move increasingly in a fibre flow 14 along the forming-wall 9 and the air moves increasingly in an air flow along the forming-wall 8. An electromagnet 15 is attached to the forming-wall 9 for the purpose of separating out metal parts from the fibre flow 14.

In the region of an outlet orifice 16 of the feed chute 10, the fibre flow 14 impinges upon a fibre roller 17 which serves to disintegrate irregularities in the fibre flow 14 and to accelerate the fibres in the fibre flow 14. Disposed on the surface of the fibre roller 17 is a plurality of pins 18 which taper conically to form a point as the spacing with respect to the axis of rotation of the fibre roller 17 increases. The fibre roller 17 rotates at high speed in the direction of rotation indicated by the arrow 19. The peripheral speed of the fibre roller 17 is variable and can be 20 to 100 m/sec. The diameter of the fibre roller 17 can amount to e.g. 1000 mm and the length of the fibre roller 17 can be e.g. 1800 mm. In this case, there are ca. 10000 conical pins 18.

A partial section 20 of the fibre roller periphery, a wall 21 lying opposite the fibre roller 17 and gluing means described hereinunder define a chute section 22 which extends approximately from the outlet orifice 16 of the feed chute 10 to the lowest point of the fibre roller 17 and comprises an outlet orifice 23 at this site. The progression of the wall 21 is configured in such a manner that the spacing between the tip of the pins 18 and the wall 21 increases progressively from an inlet orifice 24 of the chute section 22, which is adjacent to the outlet orifice 16 of the feed chute 10, to the outlet orifice 23. The wall 21 is provided on an outer side substantially over its entire length with a water-cooled cooling jacket 25.

A series of glue slot nozzles 26 is disposed in the region of the outlet orifice 23 over the entire width of the chute section 22. The outlet orifices of the glue slot nozzles 26 are located in a gap 27 which is formed by a lower end of the wall 21 and a gluing board 28. Each glue slot nozzle 26 is supplied by a separate displacement pump 29 via a connection tube 30 with glue from a glue draw-off container 31 which comprises a glue draw-off weighing device 32. For example, in the case of a process width of 1800 mm, 25 glue slot nozzles 26 having a slot length of 72 mm and a slot width of 2 mm are provided. The number of slot nozzles 26 can be varied randomly. The glue pumps 29 are preferably driven by way of a common drive shaft 33 and a common drive 34. This guarantees a uniform throughput rate of all of the glue pumps 29. It is also possible to use individually driven glue pumps. The gluing board 28 which directly adjoins the glue slot nozzles 26 is disposed over the entire width of the chute section 21. It can be angularly adjusted with respect to the chute section 22.

The gluing board 28 comprises on its surface the fin-like profile as shown in FIGS. 7*a* and 7*b*. The fin-like profile consists of elevations 101 having a base section 102 and of a blade section 103 which is disposed thereon in a perpendicular manner with respect to the gluing board 28. The base section 102 comprises an elongated base surface having concavely curved sidelines which converge to a point at the ends of the base surface. The elevations 101 are disposed in parallel rows 104 which are disposed in a perpendicular manner with respect to the movement direction of the fibres as indicated by the arrow 105. In each of the rows 104, the elevations are aligned identically, and furthermore at an acute angle with respect to the movement direction 105, i.e. the direction in which the gluing board 28 operates. Depending on the row, the elevations 101 of the rows 104 alternately comprise a positive acute angle or a negative acute angle with the movement direction 105, wherein the rows 104 are disposed offset with respect to each other.

Alternatively, the gluing board 28 can also comprise the nail-like profile as shown in FIGS. 7*c* and 7*d*. This nail-like profile consists of conical nails 106 which in turn are arranged in rows which are offset with respect to each other and extend in a perpendicular manner with respect to the movement direction 105. Furthermore, the surface of the gluing board 28 can also comprise the step-like profile as shown in FIGS. 7*e* and 7*f*. In the case of this step-like profile, steps 107 are provided which ascend in the movement direction 105.

The chute section 22 issues into the pneumatic conveying device 13. The speed at which the fibre flow 14 in the feed chute 10 moves towards the outlet orifice 16 can be adjusted by way of an air restrictor 35 in an upper duct section 40 of the pneumatic conveying device 13, in that negative pressure generated by the fan 12 is changed in the region of the fibre roller 17.

By virtue of the fact that the fibre flow 14 impinges in the region of the outlet orifice 16 upon the fibre roller 17 which rotates at high speed and the pins comprise a speed component which is at a right-angle with respect to the movement direction of the fibre flow 14, intertwining or clumped fibres are separated from each other, wherein individual fibres are scarcely damaged by the fibre roller 17.

Furthermore, the fibres are deflected by means of the fibre roller 17 into the chute section 22. In the first part of the chute section 22, the inertia of the fibres not only serves to comb through the fibres and thus as a result to disintegrate fibre lumps but also serves to accelerate the fibres to approximately the peripheral speed of the fibre roller 17. In the gluing device, this fibre speed is reached approximately after one quarter of the periphery of the fibre roller 17. In this region of the chute section 22, the fibres in a fibre flow 36 are stretched to a multiple of the fibre flow 14 in the feed chute 10. The plurality of conical pins 18 serves to generate in the chute section 22 an air flow which corresponds approximately to the peripheral speed of the fibre roller 17. By virtue of the radial forces of air and fibres, the fibres in the chute section 22 tend to move centrifugally outwards and lie against an inner side of the wall 21 of the chute section 22, so that in the chute section 22, the conical pins 18 of the fibre roller 17 are no longer in contact with the fibres after ca. one quarter of the periphery of the fibre roller 17.

By virtue of the separation of the fibre flow 36, which is produced by stretching of the fibres, and because glue is transferred over the entire width of the fibre flow 36, a large contact surface is produced for the purpose of receiving glue.

The gluing board 28 serves to deflect the fibre flow 36 in the plane of the drawing. The fibres exert a pressure upon the gluing board 28, which pressure can be adjusted by adjusting the angle of the gluing board 28 with respect to the chute section 22. The glue 37 is received by the fibres by means of mechanical abrasion of the glue 37 on the gluing board 28. The fin-like profile serves to increase considerably the friction of the fibres on the surface of the gluing board 28 with respect to a smooth surface. The alternating, inclined arrangement of the elevations 101 also serves to deflect the fibres in numerous ways and as a consequence static thorough-mixing of the fibres and of the glue 37 is achieved. In this manner, the fibres are glued in an extremely effective manner. A similar effect is achieved in the case of the above-described nail-like profile. In particular, if the surface of the gluing board 28 is provided with the above-described step-like profile, the friction of the fibres on the gluing board 28 is increased. However, the steps 107 produce a swirling action and thus static thorough-mixing of the fibres and the glue 37 is achieved. The glue is metered according to a predetermined percentage proportion of glue based upon absolutely dry fibres in relation to the fibre throughput which is recorded by the weighing device 7 of the metering bin 3.

After gluing, the fibres exit the chute section 22 and are deflected by gravitational force and by the conveyance air flowing in the direction of the arrow 38 into a suction hood 39 of the pneumatic conveying device 13 below the fibre roller 17. The conveyance air is preferably return-air which is directed in a closed circuit or is fresh air.

In all of the Figures of the drawings, like parts are designated by like reference numerals.

The embodiment according to FIG. 1*b* only differs from that shown in FIG. 1*a* by virtue of the fact that the glued fibres are drawn off by suction in an upward direction by means of the pneumatic conveying device 13.

The embodiment as shown in FIG. 1*c* differs from that shown in FIG. 1*a* by virtue of a modified arrangement of the gluing board 28 and the glue slot nozzles 26. The gluing board 28 is arranged and is angularly adjusted with respect to the flow direction of the fibre flow 36 in such a manner that the fibre flow 36 is deflected towards the pins 18 of the fibre roller 17. As a consequence, the fibres are once again caught and overtaken by the pins 18, since the fibre flow 36 is greatly decelerated by the deflection and the provision of glue. The renewed effect of the pins 18 upon the fibre flow 36 which is provided with glue serves to intensify the gluing procedure in comparison to the gluing procedure performed by means of the device as shown in FIG. 1*a*. The glue slot nozzles 26 can be adjusted corresponding to the angle of the gluing board 28 with respect to the wall 21 of the chute section 22.

The embodiment as shown in FIG. 1*d* comprises spray nozzles 41 which are disposed in the region of the outlet orifice 23 of the chute section 22 over its entire operational width. In the rotational direction 19 of the fibre roller 17, glue slot nozzles 26 and a gluing board 28 are disposed downstream of the spray nozzles 41. The spray nozzles 41 serve to spray a part of the provided quantity of glue onto the fibres, the remaining quantity of glue is sprayed onto the fibres by way of the glue slot nozzles 26. By virtue of the fact that the fibres are directed via the gluing board 28, the fibres are statically mixed. Furthermore, glue which issues out of the glue slot nozzles 26 is transferred via the gluing board 28 onto the fibres. The gluing board 28 can be angularly adjusted with respect to the flow direction of the fibres in such a manner that the fibres are re-circulated into the effective region of the pins 18 of the fibre roller 17.

The embodiment as shown in FIG. 1*e* differs from that shown in FIG. 1*d* by virtue of the fact that no glue slot nozzles are provided. The provided quantity of glue is discharged exclusively by way of spray nozzles 41. After the fibres have been sprayed with glue, they are then statically mixed on the gluing board 28, thus serving to glue the fibres in an effective manner. The gluing board 28 is angularly adjusted with respect to the flow direction of the fibres in such a manner that the fibres are then re-circulated into the effective region of the pins 18 of the fibre roller 17. This also serves in turn to mix the fibres further.

With the exception of the metal baffle plates 42 in the chute section 22, the embodiment as shown in FIG. 1*f* is formed like one of the gluing devices as shown in FIGS. 1*a* to 1*e*. The metal baffle plates 42 are disposed in one piece over the entire operational width of the chute section 22. They are inclined in a ramp-like manner in the flow direction of the fibres, in order to deflect the fibres towards the pins 18 of the fibre roller 17. In so doing, the fibres are decelerated and caught by the more rapidly moving pins 18, whereby it is once again possible to disintegrate any irregularities in the fibre flow 36. After the fibres have then been accelerated by the pins 18 and brought to the peripheral speed of the pins 18, the centrifugal force causes the fibres in turn to lie against the wall 21. As indicated by the arrow 43, the metal baffle plates 42 can be angularly adjusted with respect to the flow direction of the fibre flow 36, whereby in particular the degree of deceleration of the fibres can be influenced. Preferably, it is possible to dispose several metal baffle plates 42 over the course of the chute section 22, so that several wall sections are produced, against which the fibres lie. Two of these wall sections are shown in FIG. 1*f* and are designated by the reference numerals 21*a* and 21*b*. Located between the wall sections 21*a* and 21*b* is a region, in which the fibre flow 36 is combed through by the pins 18.

The embodiment as shown in FIG. 2*a* comprises glue slot nozzles 26 which are like-wise disposed adjacent to the outlet orifice 23 of the chute section 22. Disposed adjacent to the glue slot nozzles 26 is a gluing roller 45 which defines the chute section 22 at its outlet orifice 23. The gluing roller 45 protrudes with an outer surface 46 slightly into the chute section 22, so that the fibre flow 36 impinges tangentially upon the outer surface 46. The glue slot nozzles 26 are disposed in one plane over the entire width of the fibre roller 17 and aligned such that they discharge the glue 37 approximately in parallel with the fibre flow 36 which impinges upon the fibre roller 17.

The gluing roller 45 serves as a gluing board which rotates in the direction of the arrow 47. Its outer surface 46 is provided, like the gluing board 28, with the fin-like profile as shown in FIGS. 7*a* and 7*b*. Alternatively, the nail-like profile as shown in FIG. 7*c* and 7*d* or the step-like profile as shown in FIGS. 7*e* and 7*f* can also be provided. In the case of the gluing roller 45, the advantageous effects of these profiles are the same as in the case of the above-described gluing board 28. The outer surface 46 is chromium-plated. Approximately diametrically opposite the outlet orifice 23, there is disposed adjacent to the gluing roller 45 a rotatable brush 48 which is in contact with the outer surface 46 and a container 49 comprising cleaning water and rotates in the same direction as the fibre roller 17. The configuration of the outer surface 46 and the rotational movement of the gluing roller 45 render it possible to remove from the gluing region any possible contamination caused by glue residues in the immediate region where glue is transferred to the fibre flow 36, and the fouling is continuously cleaned by way of the brush 48. In this manner any internal contamination of the chute section 22 is obviated and the formation of fibre agglomerates is thus minimized.

Furthermore, adjacent to the gluing roller 45 there is disposed a series of spray nozzles 50 (only one is shown), which can be used for the purpose of applying an accelerator to the outer surface 46 of the gluing roller 45. Instead of using spray nozzles 50, it is also possible to use different atomizers. The spray nozzles 50 are each connected by way of a connection tube 51 to a draw-off container 53 for an accelerator which comprises a draw-off weighing device 52. The accelerator is conveyed by way of pumps 55 (only one is shown) which are driven by a motor 54, from the draw-off container 53 to the spray nozzles 50 which are disposed over the entire width of the gluing roller 45.

The gluing roller 45 protrudes with its outer surface 46 into the suction hood 39 which is bent slightly at an angle with respect to the upper duct section 40 of the pneumatic conveying device 13.

The gluing device as shown in FIG. 2*a* comprises the same means [not illustrated] for the purpose of introducing the fibres into the feed chute 10 as the gluing device as shown in FIG. 1*a*.

The embodiment as shown in FIG. 2*b* only differs from that shown in FIG. 2*a* by virtue of the fact that the glued fibres are drawn off by suction in an upward direction by means of the pneumatic conveying device 13.

In the case of the embodiment as shown in FIG. 2*c*, the gluing roller 45 is disposed in such a manner that upon impinging upon the roller the fibre flow 36 is deflected towards the pins 18 of the fibre roller 17. The glue slot nozzles 26 can be angularly adjusted with respect to the flow direction of the fibre flow 36. In the case of this embodiment, the glue slot nozzles 26 are aligned approximately in the direction of the deflected fibre flow 36. In this embodiment, the renewed effect of the fibre roller 17 also produces particularly intensive gluing.

The embodiment as shown in FIG. 2*d* is similar to the embodiment as shown in FIG. 1*d*, but instead of the gluing board 28 it comprises a gluing roller 45 which rotates in the direction of the arrow 47. The gluing roller 45 also ensures static mixing of the fibres which have previously been wetted with glue by way of the spray nozzles 41. Furthermore, the gluing roller 45 serves to wet the fibres with glue by way of the glue slot nozzles 26. In this case, the gluing roller 45 can in turn also be disposed in such a manner that the fibres are re-circulated into the effective region of the fibre roller 17.

The embodiment as shown in FIG. 2*e* differs from the gluing device as shown in FIG. 2*d* by virtue of the fact that no glue slot nozzles are provided, but the fibres are wetted merely by way of spray nozzles 41 with subsequent static mixing of the fibres by the gluing roller 45.

The embodiment as shown in FIG. 3*a* is similar to the embodiment as shown in FIG. 1*a*. However, differences can be found in the means provided for gluing the fibres. The gluing device as shown in FIG. 3*a* comprises a glue roller 60 which operates according to the principle of liquid-application rollers and which defines the outlet orifice 23 of the chute section 22 and protrudes with a partial section 61 of an outer surface 62 over the entire width of the chute section 22 into same. The outer surface 62 of the glue roller 60 is formed with recesses 63 in the form of spherical impressions, as illustrated in sections in FIG. 3*b*. The recesses 63 are dimensioned according to the required glue throughput rate. In the present case, the glue roller comprises an outer diameter of ca. 500 mm and rotates at 60 rpm. The diameter of the recesses 63 is 10 mm and the depth is 1 mm. However, it is also possible to provide different profiles, such as e.g. radial grooves or axial grooves, and the outer surface 62 can also be smooth and planar. It consists of a hard, friction-resistant material, such as e.g. hard chromium-plating. The glue roller 60 operates in combination with a glue-application roller 64 which is disposed adjacent to the glue roller 60 and forms therewith a glue reservoir 65. Glue can be supplied to the glue reservoir 65 by way of a glue supply line 66. A gap 67 is provided between the glue roller 60 and the glue-application roller 64.

With a further partial section 68 of its outer surface 62, the glue roller 60 protrudes into a glue container 69 which comprises a first glue overflow 70 and a second glue overflow 71.

The glue roller 60 can be rotated about its longitudinal axis as indicated by the arrow 72 both in the flow direction of the fibre flow 36 and in the opposite direction thereto. When rotating in the opposite direction to the fibre flow 36, the glue roller 60 obtains the glue from the glue reservoir 65, wherein the glue-application 64 rotates in the opposite direction to the glue roller 60. A film of glue is formed on the glue roller 60. The thickness of said film of glue can be determined by way of the gap 67, which can be adjusted in size by displacing the glue-application roller 64, between the glue roller 60 and the glue-application roller 64. If the glue roller comprises a smooth outer surface 62, the film of glue can have a thickness of e.g. 0.2 mm.

If glue is to be applied to the fibres from the glue container 69 instead of from the glue reservoir 65, the glue reservoir 65 is emptied and the glue-application roller 64 is positioned at a relatively large spaced interval with respect to the glue roller 60. In this case, the glue roller 60 rotates with the fibre flow 36, and the fill-level of the glue in the glue container 69 is kept at a level 73 by means of the glue overflow 71, wherein the glue roller 60 is immersed into the glue. The glue container 69 is likewise filled by way of the glue supply line 66. If the fibres are glued by way of the glue reservoir 65, the glue fill-level in the glue container 69 is kept at a lower level 74 by means of the glue overflow 70, wherein the glue roller 60 is not immersed into the glue. The glue flowing off from the glue overflows 70 and 71 returns to a glue processing device [not illustrated] for re-usage purposes.

In the case of this gluing device, the glue is also received by the fibres by means of mechanical abrasion, in that the fibre flow 36 impinges substantially tangentially upon the glue roller 60 at the contact point designated by the reference numeral 75.

The application of glue by means of this gluing device is controlled in the following manner: The current absolutely dry fibre weight in kg/h minus the known fibre moisture is determined gravimetrically by way of the weighing device 7. The volume of the glue liquor which comprises a solid resin proportion of e.g. 65% is the volume of the sum of the recesses 63 based upon one revolution of the glue roller 60. The solid resin proportion of the glue liquor, the specific weight of the solid resin and the glue liquor volume of one revolution of the roller being constants produce the solid resin proportion of one roller revolution in kg per revolution. Therefore, by changing the rotational speed of the glue roller 60, the addition of solid resin to absolutely dry fibres in kg/h is controlled in dependence upon the fibre throughput of the weighing device 7.

In turn, the embodiment as shown in FIG. 3*c* only differs from that shown in FIG. 3*a* by virtue of the fact that the glued fibres are drawn off by suction in an upward direction by means of the pneumatic conveying device 13.

In the case of the embodiment as shown in FIG. 3*d*, the glue roller 60 is disposed in a similar manner to the gluing roller 45 of the embodiment as shown in FIG. 2*c* such that as the fibre flow 36 impinges upon the glue roller 60 the fibres are deflected into the effective region of the fibre roller 17. In turn, this also renders it possible to glue the fibres in a particularly intensive manner.

In the case of the gluing devices as shown in FIGS. 1 to 3, it is possible to achieve an elongated fibre flow area of ca. 94 $m^2$/sec e.g. in the region of the gluing means.

The embodiment as shown in FIG. 4*a* is also similar to the gluing device as shown in FIG. 1*a* and is only different with respect to the means provided for gluing purposes.

Two rows of two-substance spray nozzles 81 and 82 are disposed lying opposite each other in a wall 80 of the suction hood 39 which is provided with corresponding openings, the spray nozzles are provided for the purpose of gluing the fibres, which exit the chute section 22 and are designated by the reference numeral 83, by expelling glue and air. The fibres 83 are deflected in the transition from the chute section 22 to the suction hood 39 and are spatially expanded owing to the different weight. As a consequence, a large contact surface of the fibres 83 is provided for the application of glue. In the same manner as the gluing device shown in FIG. 1*a*, the spray nozzles 81, 82 are connected in each case by way of a connection tube to a separate glue pump [not illustrated]. The spray nozzles are supplied with glue liquor in the same manner as in the gluing device as shown in FIG. 1*a*. The air required by the spray nozzles 81, 82 is made available from a general air supply.

In turn, the embodiment as shown in FIG. 4*b* only differs from that shown in FIG. 4*a* by virtue of the fact that the glued fibres are drawn off by suction in an upward direction by means of the pneumatic conveying device 13.

The embodiments as shown in FIGS. 2, 3 and 4 or even all further embodiments described hereinunder can also comprise metal baffle plates 42 in the chute section 22 as shown in FIG. 1*f*.

FIG. 5*a* shows a gluing device which is configured symmetrically in relation to the longitudinal axis of a partial section of the pneumatic conveying device 13. On both sides of the longitudinal axis, there is located in each case a gluing unit 86 and 87 respectively which corresponds in principle to one of the gluing devices according to FIG. 1*a*, 1*c* to 1*f*, 2*a*, 2*c* to 2*e*, 3*a*, 3*d* or 4*a*. The gluing means can thus be formed differently corresponding to these gluing devices described and are therefore not illustrated in FIG. 5*a*. Like parts of the two gluing units 86, 87 of the double-gluing device are each designated by like reference numerals. In addition to a particularly high throughput rate, the double-gluing device has the advantage that the fibres are subsequently mixed in an effective manner by means of the fibre flows 36 which collide with each other head-on, without using mixing tools. For lower throughput rates, the double-gluing device can also be used as an alternative to the other gluing devices in accordance with the invention, in order thus to achieve effective subsequent mixing.

As shown in FIG. 5*b*, in the case of the double-gluing device it can also be provided that the glued fibres are drawn off by suction in an upward direction by means of the pneumatic conveying device 13.

FIG. 6*a* illustrates a gluing device which operates according to the principle of one of the gluing devices as shown in FIG. 1*a*, 1*c* to 1*f*, 2*a*, 2*c* to 2*e*, 3*a*, 3*d* or 4*a*, wherein in turn the specific gluing means are not illustrated. In addition to the above-described gluing devices, the gluing device as shown in FIG. 6*a* comprises a fibre sifting unit 90.

In the case of the gluing device as shown in FIG. 6*a*, the outlet orifice 23 of the chute section 22 issues into the suction hood 39 of the pneumatic conveying device 13. Disposed opposite the outlet orifice 23 is an inlet 91 of a coarse material discharge chute 92. The coarse material discharge chute 92 extends in a vertical direction and comprises on its lower end a coarse material outlet 93. Above the coarse material outlet 93 there are disposed air supply orifices 94. Air regulation flaps 95 are provided over the cross-section of the coarse material discharge chute 92. Adjusting flaps 96 and 97 are disposed adjacent to the inlet 91.

The fibre sifting unit 90 functions in the following manner: The fibres of the fibre flow 36 issuing out of the outlet orifice 23 pass into the suction hood 39 of the pneumatic conveying device 13. Light normal material 98, i.e. average weight individual fibres, describe the beginnings of a short trajectory parabola by reason of the relatively low kinetic energy of the fibres after exiting the chute section 22, in order then to be entrained by the conveyance air flow which is directed downwardly in the pneumatic conveying device 13 and is designated by the arrow 38.

Coarse material 99 which is heavier than normal material 98 describes a longer trajectory parabola by virtue of the greater kinetic energy and thereby passes into the coarse material discharge chute 92. By means of a low air flow prevailing in the coarse material discharge chute 92, fibre particles which are in the boundary range between light and heavy are lifted back from the coarse material discharge chute 92 into the air flow of the pneumatic conveying device 13. In contrast, heavy parts of the coarse material fall into the coarse material outlet 93. The adjusting flap 96 can be adjusted in height and angle and serves to adjust the speed and the direction of the downwardly directed air flow in the suction hood 39. In this manner, this can influence the trajectory parabola of the fibre flow 36 after exiting the chute section 22. The air speed in the coarse material discharge chute 92 is initially determined by the level of negative pressure prevailing in the fibre sifting unit 90, which negative pressure can be adjusted in turn by the air restrictor 35 in the upper duct section 40 of the pneumatic conveying device 13, and secondly said air speed is determined by way of the air regulation flaps 95. The orifice cross-section of the inlet 91 can be adjusted by way of the adjusting flap 97, the height of which can be varied.

In the case of this gluing device, it is proven to be advantageous that the fibres are glued and sifted in one and the same device.

In the case of this gluing device, it is possible to draw the fibres off by suction in an upward direction by means of the pneumatic conveying device 13. By reason of its relatively low kinetic energy after exiting the chute section 22, light normal material 98 is drawn off by suction by the suction force of the fan 12, whereas the coarse material 99 describes a trajectory parabola and passes into the coarse material discharge chute 92.

FIGS. 8*a* and 8*c* respectively illustrate a gluing device which is composed substantially of a gluing device as shown in FIG. 1*a* and of a gluing device as shown in FIG. 6*a* and thus comprises a first partial unit 113 and a second partial unit 114. The gluing device serves to glue dried fibres in two steps. It comprises a fibre dryer 115, wherein a tube 116, in which the fibres are dried, is only illustrated in part. The tube 116 issues into a cyclone 117, of which the outlet 1 is connected to the transverse fibre distributing device 2. Discharge air and water vapor are discharged from the cyclone 117 by way of an outlet 118.

The fan 12 of the pneumatic conveying device 13 is connected on the output-side to a conveying line 119 which issues into a second cyclone 120 which forms part of the second partial unit 114. The outlet 1 of the cyclone 120 is connected in turn to the transverse fibre distributing device 2 which issues into the metering bin 3 of the second partial unit 114. The fan 12 of the second partial unit 114 is connected on the output-side to a conveying line 121 which leads to a forming machine [not illustrated]. As illustrated by the arrow 38 of the second partial unit 114, return air is directed from the forming machine via a line 122 into the pneumatic conveying device 13 of the second partial unit 114. By way of a further air line 123, return air is directed from the cyclone 120 into the pneumatic conveying device 13 of the first partial unit 113. This amounts to 70% of the air discharged from the cyclone 120, the remaining 30% of the air in the cyclone 120 is discharged as discharge air through an outlet 124 of the cyclone 120. Since the fan 12 of the first partial unit 113 generates 100% of the conveying air for the fibres, compensation air at a proportion of 30% is drawn in through the air supply 11 of the first partial unit 113 by reason of the prevailing negative pressure. The same applies to the second partial unit 114, wherein 70% return air is directed from the forming machine into the pneumatic conveying line 13 and 30% compensation air is drawn in through the air supply by reason of the negative pressure in the partial unit 114.

The gluing device as shown in FIG. 8*a* is designed in such a manner that in the case of a desired solid resin proportion of 10% based upon absolutely dry fibres, 5% solid resin is allocated to the first gluing step provided by the first partial unit 113. From the first partial unit 113 the fibres are conveyed by way of the conveying line 119 into the cyclone 120 and pass subsequently into the metering bin 3 of the second partial unit 114 which is required as in the case of the gluing device as shown in FIG. 6*a*, in order to be able to meter the fibres for the intended proportional addition of glue. The further features of the second partial unit 114 are the same as in the device as shown in FIG. 6*a*. In the case of the partial unit 114, it is thus possible to provide different means for gluing the fibres. The gluing step provided by the second partial unit 114 is allocated a further 5% solid resin.

The aforementioned advantages are associated with this stepwise gluing procedure. In comparison to the single-stage gluing procedure using one of the gluing devices shown in FIGS. 1 to 5, this two-stage gluing procedure is only associated with a relatively small amount of additional outlay, since sifting of glued fibres is always necessary.

In the case of the gluing device as shown in FIG. 8*a*, it can also be provided that the glued fibres are each drawn off by suction in an upward direction in the partial units 113 and 114. This type of device is illustrated in FIGS. 8*b* and 8*d* respectively.

The invention claimed is:

1. A method of directing fibres to a gluing region of a pneumatic conveying system for the production of fibreboards, the method comprising the steps of:

receiving fibres at a fibre roller, the fibre roller having a plurality of pins provided on an exterior peripheral surface and extending thereform, the fibre roller and an adjacent wall defining a chute section of a pneumatic conveyer system;

rotating the fibre roller around an axis of rotation so that the pins deflect the fibres into the chute section;

generating an air flow from the rotation of the fibre roller to accelerate the fibres along the chute section towards the gluing region.

2. The method of claim 1 further comprising supplying the fibres by a metering device through a feed chute to the fibre inlet orifice.

3. The method of claim 1 wherein the plurality of pins are conical pins.

4. The method of claim 1 wherein the air flow is generated by the pins to accelerate the fibres.

5. The method of claim 4 wherein the fibres are accelerated to approximately the peripheral speed of the fibre roller.

6. The method of claim 1 wherein the pins are configured to disintegrate irregularities in the fibres.

7. The method of claim 1 wherein the pins taper conically to form a point as the spacing with respect to the axis of rotation of the fibre roller increases.

8. The method of claim 5 wherein the peripheral speed of the fibre roller is variable.

9. The method of claim 1 wherein the spacing between the tip of the pins and the adjacent wall increases progressively from an inlet of the chute section.

10. The method of claim 6 wherein the irregularities comprise fibre lumps.

11. The method of claim 1 wherein the pins taper in a conical manner in a radial direction.

12. The method of claim 1 wherein the pressure at which the fibre are pressed against the wall during transportation through the chute section serves to increase the bulk weight of the fibres.

13. The method of claim 12 wherein at the increased bulk weight the height of the fibre flow is reduced.

14. The method of claim 4 wherein the pins are configured such that the fibres are deflected in such a manner that they are caught by the pins of the fibre roller.

* * * * *